(12) United States Patent
Magdaleno

(10) Patent No.: US 11,645,922 B2
(45) Date of Patent: *May 9, 2023

(54) ACTIVE SHOOTER RESPONSE DRONE

(71) Applicant: Guardian Robotics, Inc., Temecula, CA (US)

(72) Inventor: Andrew Magdaleno, Temecula, CA (US)

(73) Assignee: Guardian Robotics, Inc., Temecula, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/148,403

(22) Filed: Jan. 13, 2021

(65) Prior Publication Data

US 2021/0134160 A1 May 6, 2021

Related U.S. Application Data

(63) Continuation of application No. 16/534,840, filed on Aug. 7, 2019, now Pat. No. 10,922,982.

(Continued)

(51) Int. Cl.
*G08G 5/00* (2006.01)
*B64C 39/02* (2006.01)
(Continued)

(52) U.S. Cl.
CPC .......... *G08G 5/003* (2013.01); *B64C 39/024* (2013.01); *G05D 1/0022* (2013.01); *G05D 1/0027* (2013.01); *G05D 1/042* (2013.01); *B64C 2201/042* (2013.01); *B64C 2201/08* (2013.01); *B64C 2201/108* (2013.01); *B64C 2201/121* (2013.01); *B64C 2201/127* (2013.01)

(58) Field of Classification Search
CPC .......... G08G 5/003; B64C 39/024; B64C 2201/042; B64C 2201/08; B64C 2201/108; B64C 2201/121; B64C 2201/127; B64C 2201/201; G05D 1/0022; G05D 1/0027; G05D 1/042; G05D 1/104; B64D 1/18

See application file for complete search history.

(56) References Cited

U.S. PATENT DOCUMENTS 3,742,495 A 6/1973 Diamantides
7,587,764 B2 9/2009 Cox
(Continued)

FOREIGN PATENT DOCUMENTS

RU 2595052 C2 8/2016

OTHER PUBLICATIONS

B.E. Meyers & Co., Inc., "GLARE LA-9/P," 2 pages [online], [retrieved on Aug. 7, 2019]. Retrieved from the Internet: <URL:https://bemeyers.com/glare-la-9-p>.

(Continued)

*Primary Examiner* — Mussa A Shaawat
(74) *Attorney, Agent, or Firm* — KOS IP Law LLP

(57) ABSTRACT

An active shooter response system is disclosed. The system utilizes a system of sensors and drones which may receive data at a base station. The base station may centrally process the data from the drones and the sensors so that a coordinated attack on the active shooter can be formulated either automatically without human intervention or manually at the base station by an operator of the system.

16 Claims, 40 Drawing Sheets

Related U.S. Application Data

(60) Provisional application No. 62/835,378, filed on Apr. 17, 2019, provisional application No. 62/749,573, filed on Oct. 23, 2018, provisional application No. 62/725,551, filed on Aug. 31, 2018, provisional application No. 62/717,478, filed on Aug. 10, 2018.

(51) Int. Cl.
  *G05D 1/00* (2006.01)
  *G05D 1/04* (2006.01)

(56) References Cited

U.S. PATENT DOCUMENTS

| | | | |
|---|---|---|---|
| 9,085,362 B1* | 7/2015 | Kilian | B64F 1/027 |
| 9,459,620 B1* | 10/2016 | Schaffalitzky | B64D 1/12 |
| 9,488,442 B2 | 11/2016 | Varga | |
| 9,527,604 B2* | 12/2016 | Melish | B64F 1/025 |
| 9,589,448 B1 | 3/2017 | Schneider | |
| 9,739,870 B1* | 8/2017 | Beckman | G05D 1/0033 |
| 9,957,045 B1 | 5/2018 | Daly | |
| 9,973,261 B1 | 5/2018 | Hardy | |
| 10,155,587 B1* | 12/2018 | Tang | B64D 47/02 |
| 11,492,114 B1* | 11/2022 | Filipovic | B64C 39/024 |
| 2009/0281660 A1 | 11/2009 | Schmidt | |
| 2009/0288550 A1 | 11/2009 | Willner | |
| 2010/0163621 A1 | 7/2010 | Ben-Asher | |
| 2010/0170383 A1 | 7/2010 | Willner | |
| 2011/0064022 A1* | 3/2011 | Curtin | H04L 45/00 370/328 |
| 2013/0214089 A1 | 8/2013 | Cox | |
| 2015/0158587 A1 | 6/2015 | Patrick | |
| 2015/0346722 A1 | 12/2015 | Herz | |
| 2016/0214717 A1 | 7/2016 | De Silva | |
| 2016/0274577 A1 | 9/2016 | Heinonen | |
| 2016/0364989 A1* | 12/2016 | Speasl | G08G 5/0069 |
| 2017/0003689 A1* | 1/2017 | Lee | G05D 1/0669 |
| 2017/0006417 A1* | 1/2017 | Canoy | H04B 7/18506 |
| 2017/0050749 A1 | 2/2017 | Pilskalns | |
| 2017/0059692 A1 | 3/2017 | Laufer | |
| 2017/0092109 A1 | 3/2017 | Trundle | |
| 2017/0129605 A1* | 5/2017 | Wu | B05B 12/02 |
| 2017/0183106 A1 | 6/2017 | Yu | |
| 2017/0190420 A1* | 7/2017 | Lee | H04W 12/06 |
| 2017/0197718 A1* | 7/2017 | Buchmueller | B64C 17/00 |
| 2017/0205827 A1 | 7/2017 | Rezvani | |
| 2017/0253330 A1* | 9/2017 | Saigh | G08G 5/0069 |
| 2017/0286887 A1 | 10/2017 | Moran | |
| 2017/0329956 A1 | 11/2017 | Lu | |
| 2018/0067502 A1* | 3/2018 | Chi-Hsueh | B64D 47/08 |
| 2018/0157259 A1 | 6/2018 | Myslinski | |
| 2018/0164080 A1 | 6/2018 | Chi-Hsueh | |
| 2018/0201371 A1* | 7/2018 | Kramer | B64D 1/16 |
| 2018/0233009 A1 | 8/2018 | Spector | |
| 2018/0245890 A1* | 8/2018 | Allen | G08B 15/00 |
| 2018/0322749 A1* | 11/2018 | Kempel | G05D 1/0094 |
| 2018/0327091 A1 | 11/2018 | Burks | |
| 2019/0002103 A1 | 1/2019 | Gomez Gutierrez | |
| 2019/0066032 A1 | 2/2019 | Taveira | |
| 2019/0068382 A1 | 2/2019 | Theodore | |
| 2019/0077503 A1 | 3/2019 | Reddy | |
| 2019/0130770 A1 | 5/2019 | Di Benedetto | |
| 2019/0260768 A1 | 8/2019 | Keshav | |
| 2019/0285388 A1 | 9/2019 | Klar | |
| 2019/0318596 A1* | 10/2019 | Pacella | G05D 1/0027 |
| 2019/0360783 A1 | 11/2019 | Whittaker | |
| 2020/0108923 A1 | 4/2020 | Smith | |
| 2020/0108925 A1 | 4/2020 | Smith | |
| 2020/0108926 A1 | 4/2020 | Smith | |
| 2020/0122828 A1 | 4/2020 | Kim | |
| 2020/0290737 A1 | 9/2020 | Ivans | |
| 2021/0063120 A1* | 3/2021 | Taveniku | B64C 39/024 |

OTHER PUBLICATIONS

International Search Report and Written Opinion on related PCT application (PCT/US2019/045774) from International Searching Authority (RU) dated Apr. 16, 2020 (11 pages).

Raytheon Company, "Boomerang III," 2 pages [online], [retrieved on Aug. 7, 2019]. Retrieved from the Internet: <URL: https://www.raytheon.com/capabilities/products/boomerang>.

* cited by examiner

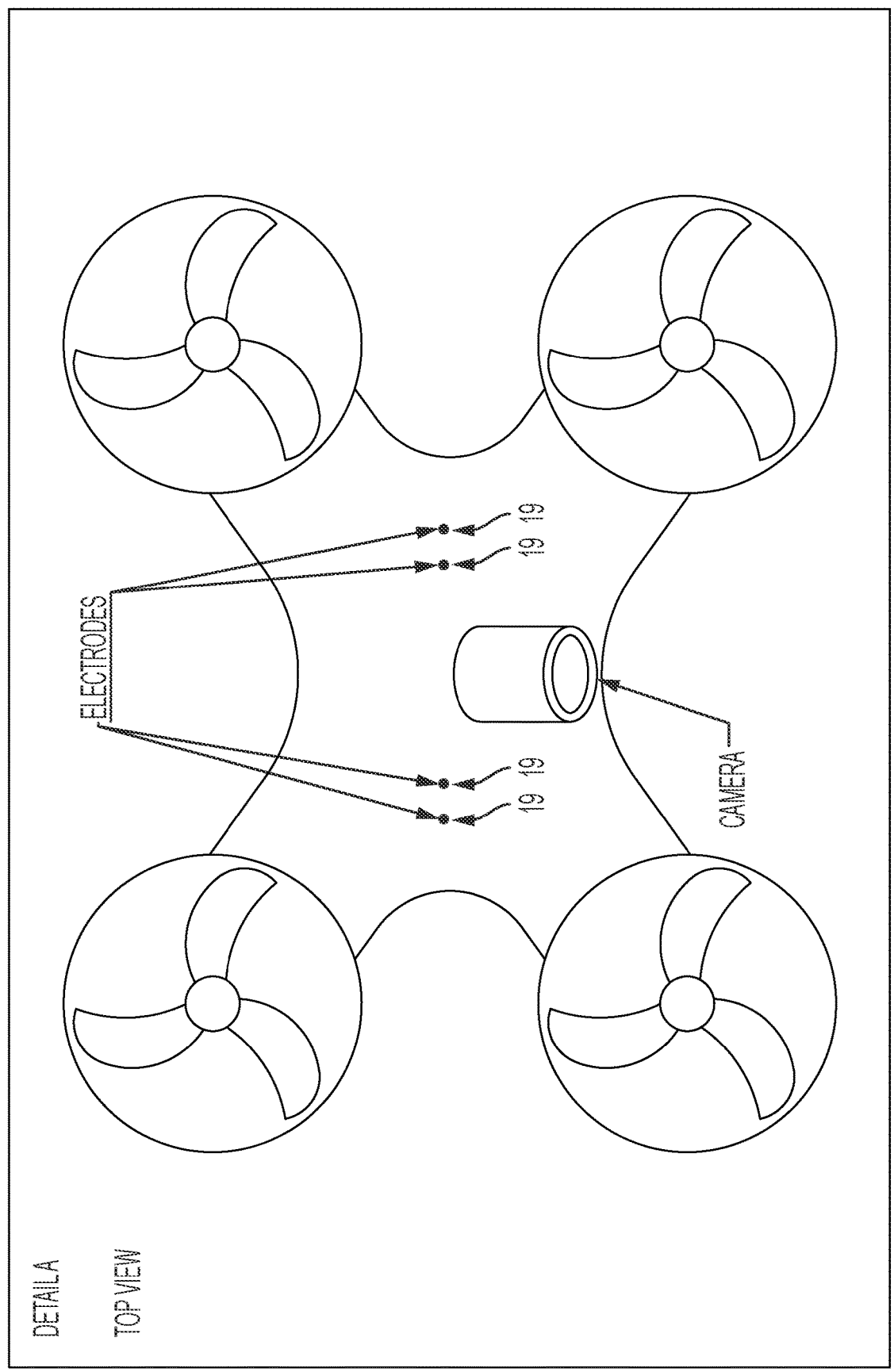

ACTIVE SHOOTER RESPONSE DRONE

CROSS-REFERENCE TO RELATED APPLICATIONS

This application is a continuation application of U.S. patent application Ser. No. 16/534,840 filed on 2019 Aug. 7, which claims the benefits of U.S. Prov. Pat. App. Ser. No. 62/717,478, filed on 2018 Aug. 10, U.S. Prov. Pat. App. Ser. No. 62/725,551, filed on 2018 Aug. 31, U.S. Prov. Pat. App. Ser. No. 62/749,573, filed on 2018 Oct. 23, and U.S. Prov. Pat. App. Ser. No. 62/835,378, filed on 2019 Apr. 17, the entire contents of which are expressly incorporated herein by reference.

STATEMENT RE: FEDERALLY SPONSORED RESEARCH/DEVELOPMENT

Not Applicable

BACKGROUND

The various embodiments and aspects disclosed herein relate to a system for neutralizing an active shooter.

Mass shootings are unfortunate. Active shooters who try to harm many people in a short amount of time exists in our world. No one knows when they will strike and who the next mass shooter will be.

As such, there is a need for a method and device for neutralizing the threat created by mass shooters.

BRIEF SUMMARY

The various aspects and embodiments disclosed herein relate to an active shooter response system using drones. The drones may act alone or in combination with each other to neutralize the active shooter either automatically without human user intervention or manual by a drone pilot. Even if some of the neutralizing or deterring functions of the system may be done automatically, other functions may be done by human intervention. Moreover, the drones can act in cooperatively with each other to neutralize the active shooter. For example, in an embodiment, the operator of the base station does not manually fly the drones but identifies who is the active shooter for the drones to target on a display at the base station. In another embodiment of the system, the operator may pilot an individual drone at the base station while the base station controls the rest of the drones. They may work together to locate and neutralize the active shooter.

More particularly, a system for neutralizing an active shooter is disclosed. The system may comprise a flying drone having a wireless transmitter; a base station having a wireless transmitter, the transmitter of the base station in wireless communication with the wireless transmitter of the flying drone for transmitting data between the flying drone and the base station; a sensor in communication with the wireless transmitter of the flying drone for communicating data from the sensor to the base station; and an offensive mechanism attached to the flying drone, the offensive mechanism being activated when the flying drone is sufficiently close to the active shooter to neutralize the shooter.

The offensive mechanism may be a pepper spray mechanism which is operative to disperse pepper spray at the active shooter, shock electrodes, propeller blades, a hardened body, a glass breaker or a combination thereof.

The base station may be operative to control the flying drone.

The flying drone may be capable of flying faster than 50 miles per hour.

The system may further comprise a plurality of flying drones which are all in wireless communication with the base station. Plus, the base station may be operative to transmit information and commands between flying drones to coordinate an attack of the flying drones against an active shooter.

The base station may be operated by a human operator and the human operator may control a first (e.g., only one) drone from the plurality of drones. A second drone from the plurality of drones may perform a different maneuver compared to the first drone. The second drone may be controlled by the base station which coordinates its movement to be in sync with the first drone depending on the maneuver of the first drone. Moreover, the first, second and plurality of drones may be configured to perform attack formations and maneuvers. For example, the operator at the base station may set the drones in a deter function. In this function, when the first drone approaches the active shooter, the second and other drones surround the active shooter and rest on the ground to preserve battery. The operator at the base station may also set the drones in an attack function. In this function, when the first drone approaches the active shooter, the second and other drones may surround and remain in the air in an attack formation.

The sensors may be optical sensors, audible sensors, infrared sensors or a combination thereof.

In another aspect, a drone mount for charging a drone during a ready state is disclosed. The drone mount may comprise a support attachable to a surface, the drone being supported by the support when the drone is in a ready state and the drone being detached from the drone when the drone is in an activate state for responding to a person that needs to be neutralized; and a charger in electrical communication with a power supply for charging the drone while in the ready state, the charger positioned so that a corresponding charger of the drone is aligned to and in contact with the charger of the drone mount when the drone is supported by the support.

The support may be an extended arm angled upward so that the drone can hang on the extended arm when the drone is in the ready state and fly upward off of the extended arm as to the drone flies off of the extended arm to the active state to respond to the person that needs to be neutralized.

The electrical contact of the drone mount may be in communication with a processor and memory to download data from the drone when the drone is in the ready state.

In another aspect, a drone enclosure for protecting the drone while the drone is in a ready state is disclosed. The drone enclosure may comprise a container sufficiently large to enclose the drone; a door pivotable between an opened position and a closed position, the door being positioned at an angle so that gravity transitions the door from the closed position to the open position; and a latch attached to the container and operative to hold the door in the closed position, the latch being remotely operable so that the latch can release the door and gravity will transition the door from the closed position to the opened position to allow the drone to fly out of the container and transition from the ready state to the active state.

The drone enclosure may further comprise a base station in communication with the latch. The base station may be operative to send a signal to the latch to release the door.

The drone enclosure may further comprise a charger in electrical communication with a power supply for charging the drone while in the ready state. The charger may be positioned so that a corresponding charger of the drone is aligned to and in contact with the charger of the drone enclosure when the drone is inside the container.

The charger of the drone enclosure may manage a battery of the drone by discharging the battery of the flying drone to extend a life of the battery of the flying drone.

In another aspect, a drone for neutralizing a human exhibiting dangerous behavior is disclosed. The drone may comprise a propeller which spins to cause the drone to fly through the air; a body with the propeller attached to the body; a processor attached to the body for controlling a flight path of the drone; a battery attached to the body and in communication with the processor for powering the processor and the propeller; a liquid or powder repellant or marking agent; a pepper spray canister attached to the body, the canister defining a lower portion and an upper portion, the upper portion of the canister being attached to the body of the drone, the lower portion of the canister having frangible lines, the canister defining an interior cavity with the agent contained in the interior cavity; a flammable paste within the container; an explosive material disposed within the container and the flammable paste being in contact with the explosive material; and an igniter disposed within the flammable paste and in electrical communication with the battery so that energy from the battery is operative to selectively ignite the igniter to start a fire with the flammable paste.

In another aspect, a method of neutralizing a person is disclosed. The method may comprise the steps of traversing a drone in close proximity to the person so that the person can see or hear the drone; sensing an activity of the person with a sensor on the drone or mounted on a ground or building; transmitting data from the sensor back to a base station to process the data; transmitting an instruction to the drone from the base station to activate an offensive mechanism of the drone against the person; and traversing the drone to follow the instruction sent by the base station.

The method may further comprise the step of transmitting instructions to the drone to fly 8 feet or higher above ground level so that any projectiles being shot at the drone will not directly hit any other bystanders.

The method may further comprise the step of transmitting instructions to the drone to fly in a square, circular, oblong, zig-zag, front to back, side to side, diagonal pattern or combinations thereof about the person to be neutralized.

The method may further comprise the step of deactivating an anti crash sensor of the drone and transmitting instructions to the drone to fly into the person to be neutralized at a speed greater than 40 miles per hour.

The method may further comprise the step of deactivating an anti crash sensor of the drone and transmitting instructions to the drone to fly into a glass window at a rate so that a glass breaking tip mounted to an upper side of the drone is optimally positioned to break the glass when the drone is rammed into the glass.

The method may further comprise the step of transmitting instructions to the drone to fly directly toward the person to be neutralized then to fly upward and away from the person to be neutralized so that the flight path when the drone flies upward and away is aligned to the person to be neutralize, and to release a deterring agent attached to the bottom side of the drone when the flight path is aligned to the person to be neutralized.

The method may further comprise the steps of traversing first and second drones toward the person that needs to be neutralized; transmitting instructions from the base station to the first drone to point a sensor of the first drone toward the person to be neutralized; transmitting data from the sensor of the first drone from the first drone to the base station; and transmitting instructions from the base station to the second drone to activate an offensive mechanism of the second drone against the person to be neutralized based on the data sent from the first drone to the base station.

In the method, the sensor of the first drone may be a camera with a field of view of the camera pointed toward the person to be neutralized.

In the method, the step of traversing the first drone toward the person may include the step of traversing the first drone to hover over the person.

The method may further comprise the steps of detecting a feature of an area with a camera; recognizing the feature of the area within a topographical map stored in a computer; and defining a location of the drone upon matching the visualized feature from the camera and the stored feature in the computer.

The method may further comprise the steps of: transmitting data regarding the feature to the base station; performing the recognizing step at the base station; and transmitting location data based on the transmitting data step and the performing step back to the drone.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 26A illustrates a detail view of electrodes fitted on the drone;

DETAILED DESCRIPTION

Figure 1:
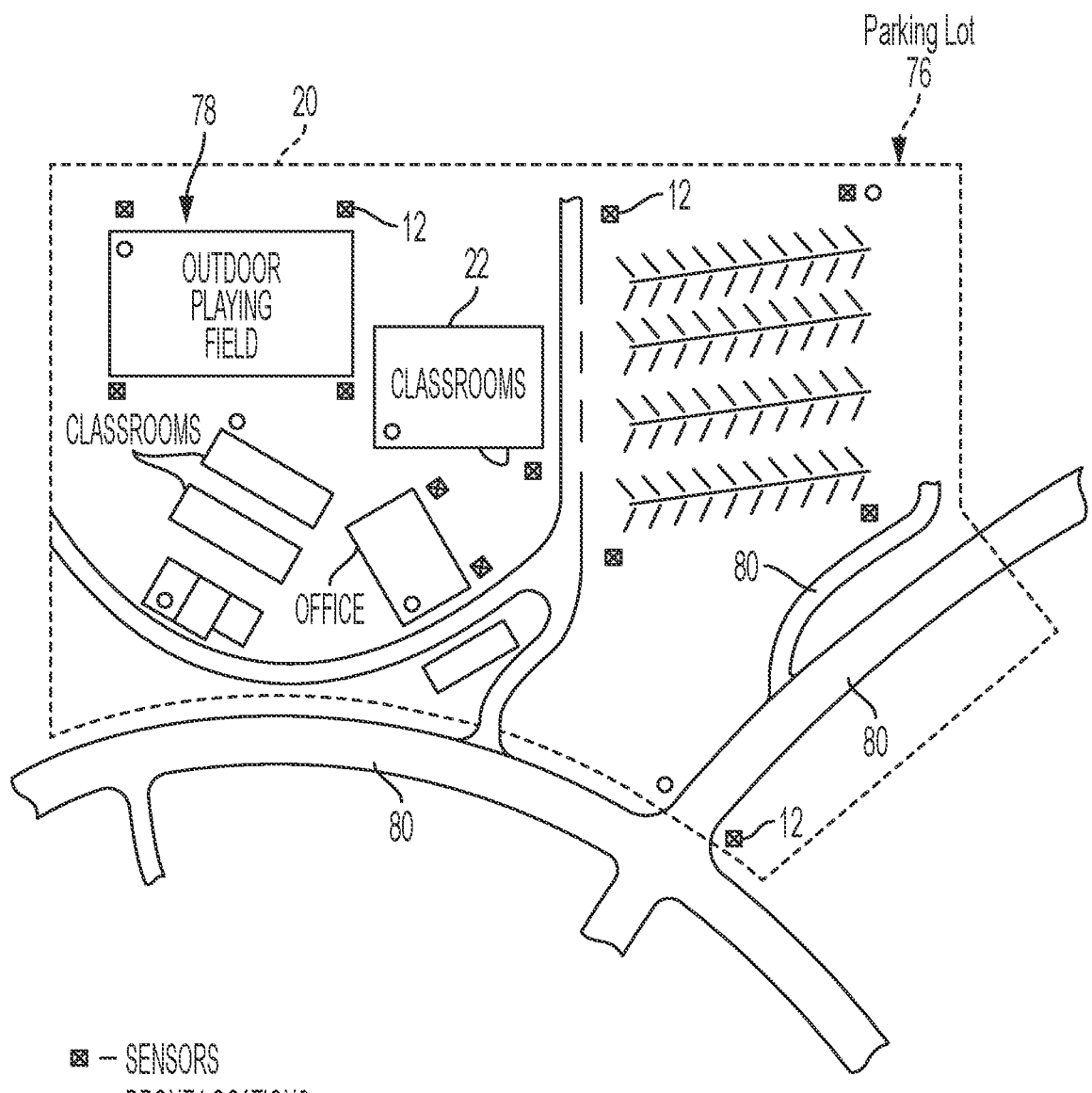
FIG. 1 is a topographical view of a school property with an active shooter response system.
Figure 2:
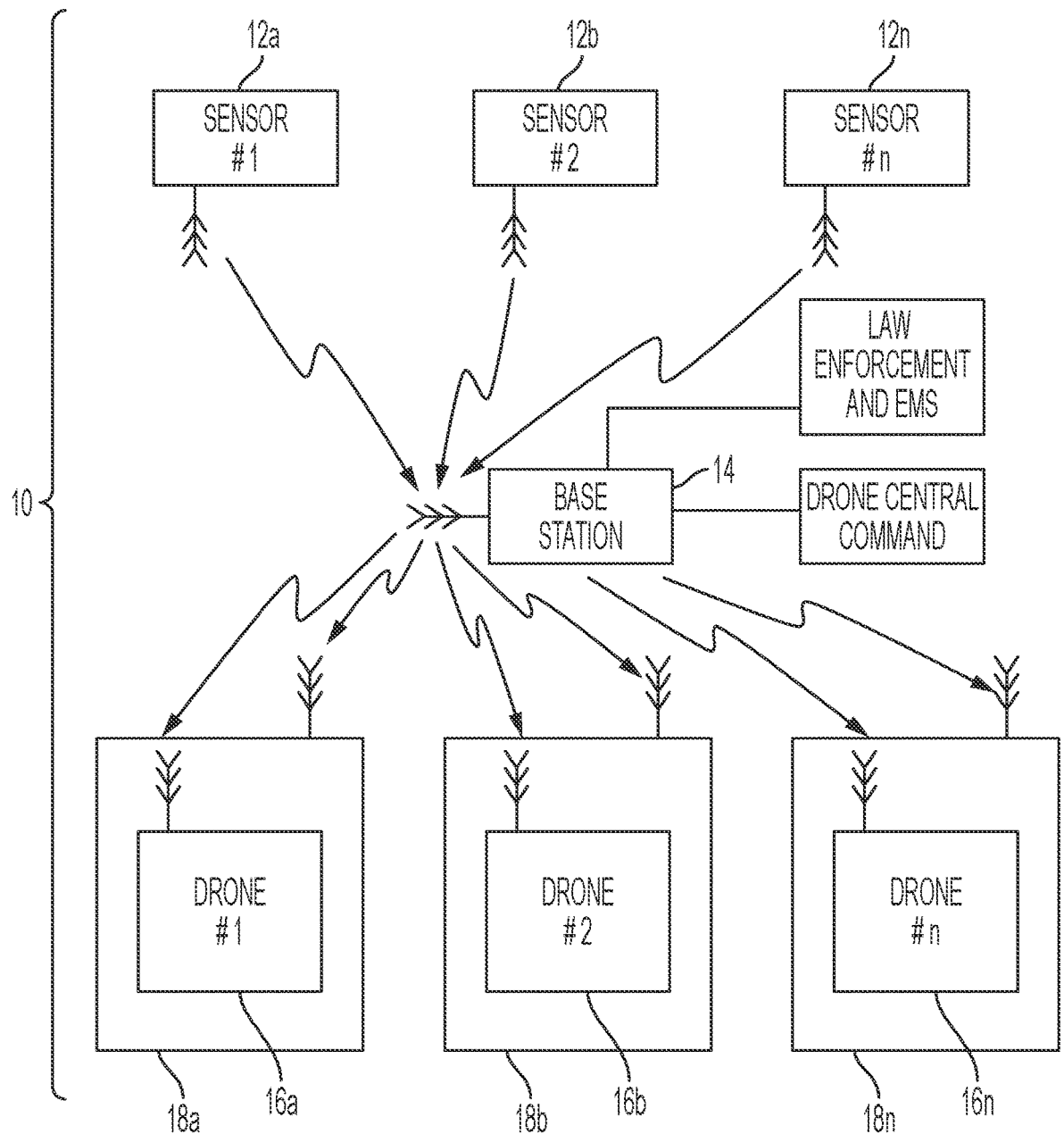
FIG. 2 is a schematic view of an active shooter response system.

Referring now to the drawings, an active shooter response system 10 is shown (See FIG. 2). The active shooter response system may include a plurality of sensors 12, base station 14 and a plurality of drones 16. The sensors 12 and the drones 16 may be located at or near pedestrian traffic. The sensors 12 and drones 16 may be placed throughout a school property 20 (See FIGS. 1 and 10). The sensors 12 may be placed at various strategic locations on the school property 20 (See FIG. 1; e.g., parking lot, roadway, sidewalks, football field, baseball field, pedestrian corridors, vehicle corridors, etc.) as well as inside of buildings 22 (See FIG. 10; e.g., classroom, hallways, multipurpose room, theater room, etc.). The sensors 12 and the drones 16 may be protected within a hardened enclosure 18 so that an active shooter cannot disable a portion of or the entire fleet of drones 16 of the active shooter response system 10 by shooting at the enclosure 18. Upon detection of an active shooter with the sensors 12, the base station may deploy the drones in order to contain or neutralize the active shooter 24. The drones 16 may be fitted with pepper spray canisters for neutralizing or slowing down the active shooter 24 in causing property damage or murdering people (i.e., students, teachers, administrators, police officers, etc.). Additionally, it is contemplated that the drones may act alone or in combination with each other to physically ram property and/or the active shooter to neutralize the active shooter.

Figure 10:
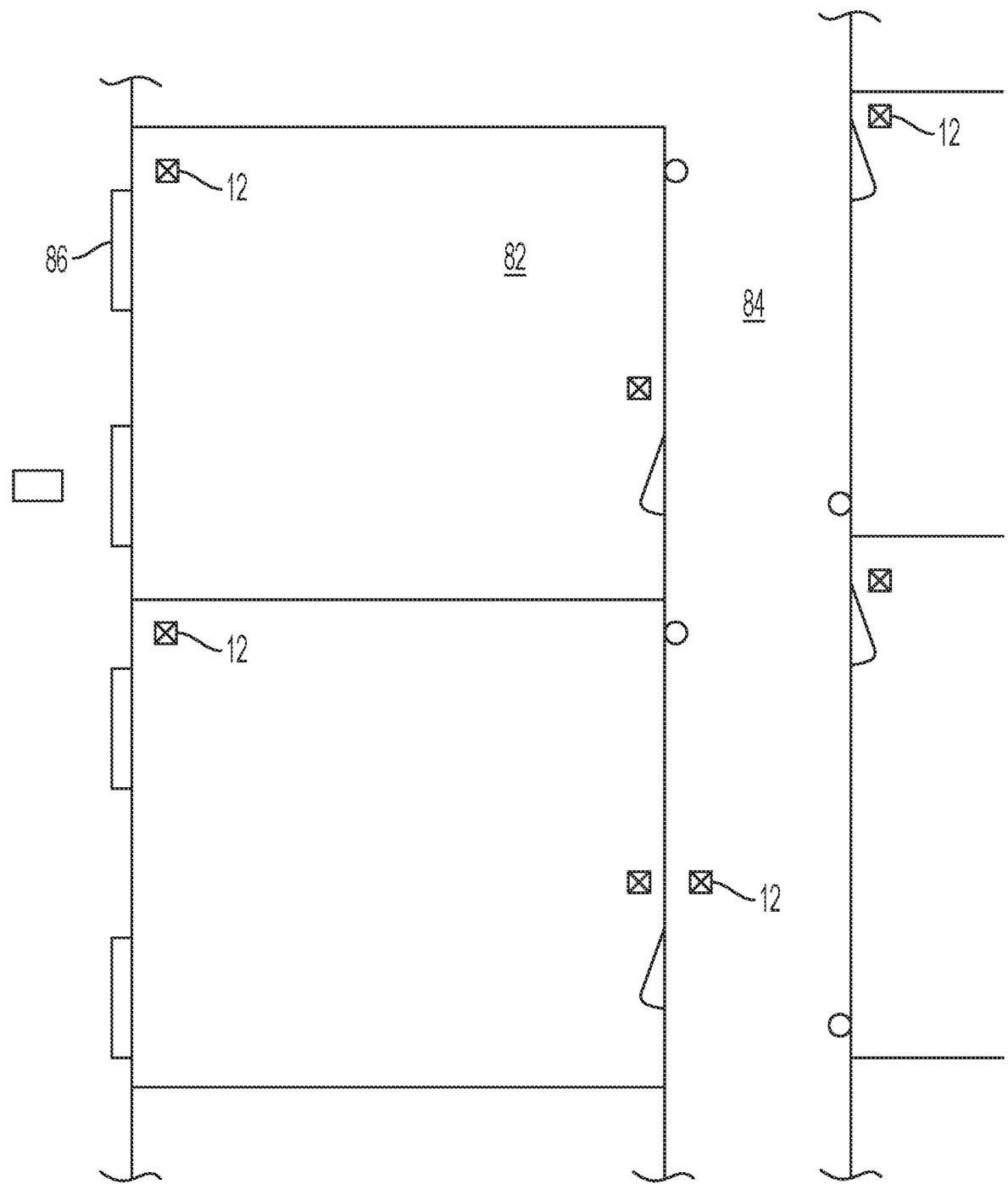
FIG. 10 is a schematic view of classrooms and the hallway of a building with the active shooter response system.

Referring now to FIGS. 1 and 10, the sensors 12 may be stationary. They may be fixed to a building, structure, ground or other stationary object. The sensors 12b, if directional such as a video or still shot camera, may pan and tilt. The camera sensor 12b may rotate about at least 45 degrees and preferably rotates 360 degrees. The camera sensor 12b may also tilt about at least 45 degrees and preferably rotates 270 degrees. For the purposes of clarity, rotation of the camera sensor 12b may be about a vertical axis perpendicular to the ground and tilt may be about a horizontal axis which is perpendicular to the vertical axis. As used herein the sensors (e.g., cameras, audible sensors) described herein may be controlled by the base station 14 or by a human being in communication with the base station.

A plurality of sensors may be deployed throughout the school property 20. In particular, the sensors 12 may be located at entry points to the school property 20, at frequented areas such as the parking lot, outdoor playing field, playgrounds, eating areas, hallways, classrooms, gymnasiums and also at or near entry points into the buildings 22 on the school property 20. For example, as shown in FIG. 1, the sensors 12 may be placed at four corners of the parking lot 76, outdoor playing field 78, near buildings 22 and near roads 80. The sensors may also be placed in classrooms 82 and hallways 84, as shown in FIG. 10. The sensors 12 may be any one or a combination of the following types of sensors including but not limited to an optical sensor 12a, sound sensor 12b, and an infrared sensor 12c.

The sensor 12 may also be an optical sensor (i.e. stereoscopic camera, camera or video) 12a that can detect or discriminate between students, officers and an active shooter. The optical sensor can detect and discriminate between students, officers and an active shooter 24 via facial recognition, uniform recognition, and also whether the person or moving object is holding a firearm. By way of example, and not limitation, most students and faculty of the school may be registered with the system 10 in that their faces are taken by the system and stored in the base station 14. Moreover, on-site armed officers that are permitted to have a firearm on the school property 20 may also be registered with the system. Their faces (e.g., students and police officers) may be registered with the system so that the system can recognize them during an active shooter situation. In lieu of or in addition to facial recognition, authorized people or regular people that are frequently on the school property may be assigned a wireless beacon which communicates with the base station. The beacon tells the system that they are present and that the drones should not hurt or harm those carrying the wireless beacon. Anyone that is not registered with the system may be considered a potential active shooter or a moving object for continuous monitoring during the active shooter situation. Moreover, if a person that is recognized (e.g., facial recognition or beacon) in the system is identified as a potential active shooter, the drone 16 may act to neutralize or slow down the active shooter. By way of example and not limitation, a person in the system may be identified as the active shooter manually by a person operating the base station 14. The person can be identified as the active shooter by the drone pilot. For example, the drone pilot will see a person on a display associated with the base station. The display receives the camera feed from the camera of the drone. The user can press the display on, near or adjacent to the person to identify the active shooter with his or her finger or mouse. In an alternate embodiment, the display that the drone pilot views may have each of the people in the display identified by a unique identifier (e.g., 1, 2, 3, etc.). Once identified the drone and/or base station can continually keep track of the location of the active shooter. Moreover, the base station can send commands to the drones to mitigate harm that the active shooter is trying to inflict on property and people of the school.

Additionally, because some active shooters 24 may be one of the students of the student body of the school, a student, faculty or other registered face within the system may be identified as the active shooter if the system (i.e., optical sensor 12a) detects that the registered person is one who does not have authorization to carry a firearm or possess a firearm on school property or such person has been identified as shooting another registered person. The sensors 12 may send or transmit the data it collects back to the base station 14 for further processing. If the further processing by the base station 14 concludes that a certain strategic plan of action of the drones 16 is necessary in order to neutralize at the shooter 24, the base station 14 may activate and send the drones 16 to the active shooter 24 to neutralize the active shooter. The optical sensor 12a may be a pan, tilt and zoom camera. The optical sensor 12a may be enclosed within a hardened enclosure 18 that can withstand one or more gunshots. It can have a window, through which, the optical sensor 12a views its surroundings.

It is also contemplated that students and on-site officers and faculty may have a transponder or beacon that communicates with the sensor 12 and transmits that information back to the base station 14. In this way, the system can track safe targets and not attack safe targets during an active shooter situation. Moreover, the system 10 can then spend more of its computer processing power on locating active shooters instead of tracking safe targets.

The sound sensor may detect gun shots. In particular, the sound sensor may detect an elevated decibel reading caused by the gunshot. The elevated decibel reading may be abnormally high decibel reading during normal school hours. Alternatively, the elevated decibel reading may have a gunshot profile which is matched to a database of gunshot profiles in the base station 14. For example, the plurality of sound sensors that sensed the gun shot may each sense a different sound decibel level when the gun is shot at a particular location. Because the sound bounces off of the walls, it may not be necessarily true that the location of the gun shot can be triangulated by the sound magnitude of the gun shot sensed by the plurality of audible sensors. It may be that a first sensor may sense the gun shot sound at a higher decibel level compared to a second sensor that is located physically closer to the gun shot. The reason might be that the first sensor might have a direct unimpeded line of sight with the gun shot, whereas the second sensor might have a building disposed between the gun shot and the second sensor. Upon hearing or sensing a gun shot, the sensors can triangulate or otherwise locate a location of the gun shot based on an intensity of the sensed sound from the various sound sensors 12 or the gun shot profile.

The sensor 12 may also be an infrared sensor 12c that can locate a heat signature of a hot barrel of a gun or rifle that has been discharged. The heat from the exploded gun powder will increase a temperature of the barrel of the hand gun or rifle. Additionally, the infrared sensor can also sense heat from the exploding gas exiting the firearm's muzzle and the ejected bullet casings from the firearm. The heat sensor or infrared sensor can sense a hot barrel of a firearm that has already been discharged.

The sensors may be an optical sensor (e.g., camera), a sound sensor, an infra red sensor or other type of sensor. The sensor may communicate or transfer data and instructions to and from the drone and/or the base station. The drone may also communicate or transfer data and instructions to and from the sensors and/or the base station. Put simply, the communication between the sensors, drones and the base station may happen directly from the drone to the base station or the sensor to the base station. Or, communication can happen via an intermediate step such as from the drone to the sensor to the base station or the sensor to the base station to the drone. All intermediate permutations of communication are contemplated.

To more effectively deploy the drones 16 and the sensors 12 on the school property, a topographical map of the school property 20 may be taken. The topographical map may be a two-dimensional identification of various structures on the school property 20 including but not limited to buildings, poles and signs. However, it is also contemplated that the topographical map may be a three-dimensional rendering of the school property 20. The three-dimensional rendering may include locations of buildings, signs, poles, and other structures on the school property. It may also include elevation data of these structures. The three-dimensional map may be programmed into the base station 14 and/or the drones 16. The pre-programming of the three-dimensional topical map into the base station 14 and/or the drone 16 may be utilized to make navigating the drones 16 between building or on the school property more efficient. By way of example not limitation, the drones can be pre-programmed so that they do not fly into a brick wall or some other obstacle unless overridden automatically by the base station or manually by a drone pilot. The three-dimensional topographical map can also be used to locate windows 86 (see FIG. 10) through which the drones 16 can break to enter an otherwise locked down building 22. For example, as discussed below, if the drones need to enter into the building through a window, the drones can be programmed to break through a window by physically ramming into a window. The three-dimensional topographical map will provide the specific location of the window which can be broken so that the other drones can have access to the inside of the building. In this manner, the drones can be pre-programmed to accomplish a specific task or to maneuver by and through structures. The topographical map mitigates the drones from running into a wall or structure that would needlessly decapacitate the drone. If a user takes over manual flight of any one of the drones, then the topographical map may be used as a way to limit where the drones 16 can fly so that the drones do not fly into a structure. In other words, even if the drone operator tried to ram the drone 16 into a structure, the topographical map may prevent the drone from hitting the structure. This can be done by plotting the coordinates of the topographical map and tracking the drone location through GPS or triangulating the location of the drones 16 via the sensors 12 in real time or using the camera on the drone to identify unique features and to find those unique features in a topographical map stored on the system (e.g., simultaneous localization and mapping technology). Moreover, the drones 16 may have proximity sensors below, on top and on the sides of the drones to prevent the drones from unintentionally hitting a structure. This makes the system 10 more forgiving to user or drone pilot error. Also, the drone pilot if one is used, may direct the drone to a particular area without having to manually control the controls of the drones. In this regard, the drones may fly to such area without any drone pilot (i.e., user intervention) and avoid all structures because of the three-dimensional topographical map of the school property 20.

In addition to a three-dimensional physical topographical map, it is also contemplated that a gun shot sound map may be made of the school property 20. By way of example and not limitation, gun shots may be taken at various locations throughout the school property 20. The sound sensors 12 may record the decibel levels and/or gunshot sound profiles of each gun shot at the various locations throughout the school property 20. Because sounds of the gun shots that might bounce off of walls of the buildings 22 or other structures on the school property 20, the gun shot sound profile may take such things into account to make up the gun shot sound profile. When sounds bounce off of walls and structures, the gun shot may sound closer than it really is or further than it really is. By taking multiple decibel readings of various gunshots at different locations on the school property, the way that the sounds bounce off of structures can be accounted for in lieu of calculating a location based on a straight forward triangulation calculation. By way of example not limitation, in an environment where there are multiple buildings, the sensors 12 may not be able to properly triangulate a location of a gun shot based on the intensity of the sound. As discussed, the gun shot sound may bounce off of nearby walls and structures that change the intensity of the sound to the distance to the gun shot location. Put simply, a sensor located closer to the gun shot may be or may receive or sense a decibel level lower than a sensor that is further away from the gun shot if the gun shot sound were to bounce off of walls and somehow focus the sound waves to the sensor further away from the gun shot and while blocking the sound wavers to the closer of the two sensors 12. By taking a sound map of the school property, the location of the gun shot may be determined based on the sound map and not by triangulation or a combination of the two. For example, the general location of the gun shot may be performed by triangulation but a more specific location of the gun shot may be determined by use of the sound map. In this way, only a sub set of the sensors 12 may be activated to reduce the load on the processor of the base station when making calculations and controlling the drones.

Alternatively, the location of the gun fire can be located by sending out one or more drones to search the general location of the gunfire. For example, when the drone(s) is inspecting a location for gunfire, the drone's sensor(s) can sense characteristics of gunfire such as heat signatures from the infrared sensor, high decibel readings from an audible sensor and other sensors described herein. If a gunfire characteristic is sensed, then the drone can communicate such information to the base station 14.

The drone 16 (See FIG. 6) may be modeled after a race drone rather than an aerial photography drone. However, it is also contemplated that the drone 16 may be modeled after an aerial photography drone. The drone 16 may have one or more sensors including but not limited to an optical sensor (i.e. camera), audible sensor and an infrared sensor 32. It may also have a transponder transceiver for communicating with a transponder worn by students, faculty and police officers of a school so that the system 10 may identify authorized individuals versus individuals that are unauthorized on the school property. Additionally, the drone may have propellers attached with a nut 34. An upper portion of the nut 34 may have a glass breaking tip 36. It is also contemplated that the propellers may be attached with other securing mechanisms. However, the upper portion of the securing mechanisms may have a glass breaking tip 36.

Also, an underside of the drone 16 may have one or more pepper spray canisters 38. The sensors 30 (i.e. camera) or the camera 30 in combination with the infrared sensor 32 may be utilized to discriminate between the active shooter 24, a police officer and students. The physical drone itself 16 may be also be used to neutralize the active shooter 24 or assist in defensive maneuvers. For example, the drone itself may be used as a ram to hit the active shooter 24. The glass breaking tip 36 may be used to break through a window of a building so that other drones of the active shooter response system 10 may have access to an otherwise closed or locked building. The pepper spray canisters 38 may be used to chemically neutralize the active shooter 24.

Figure 7:
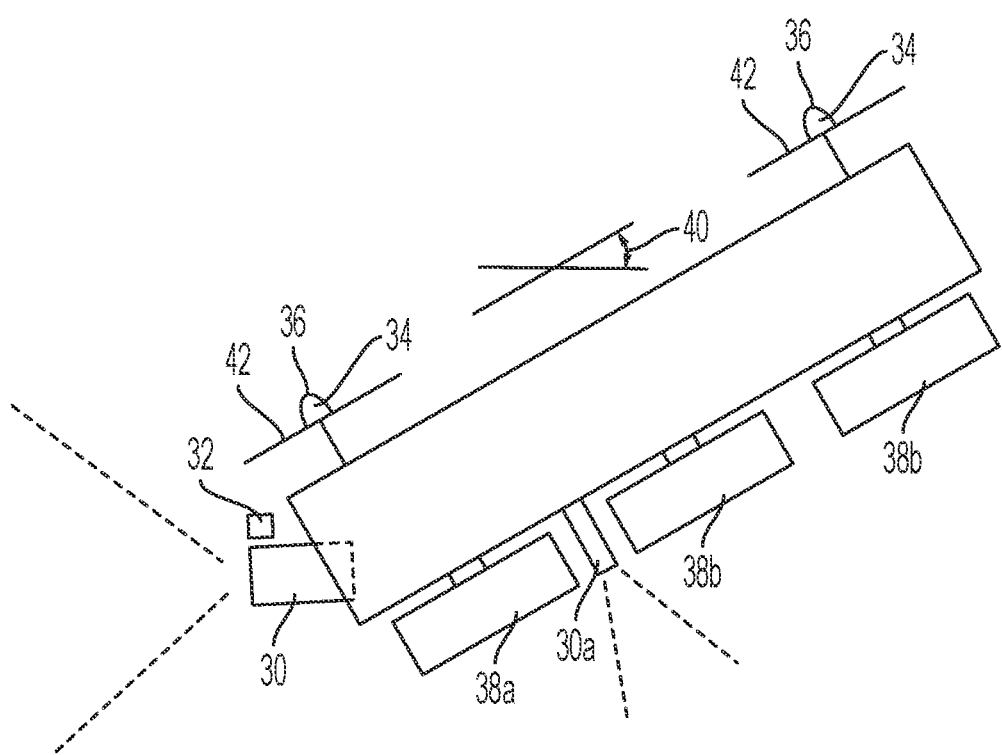
FIG. 7 illustrates a side view of the drone while it is moving forward.
Figure 11:
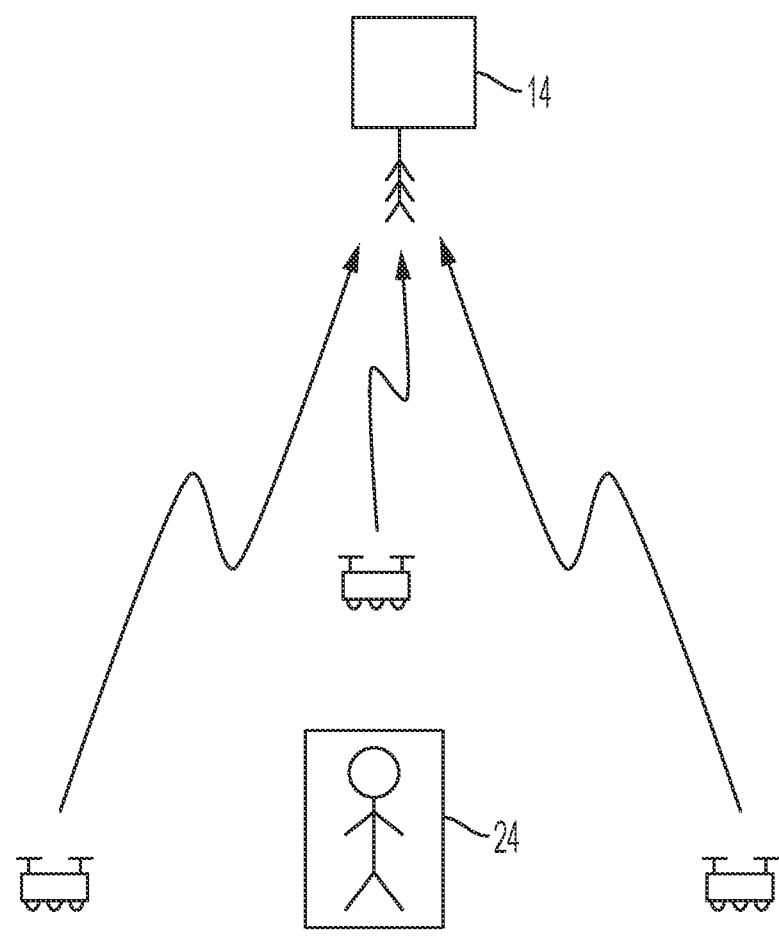
FIG. 11 is a schematic view of the plurality of drones cooperating with each other via the base station.

The drones 16 may work in combination with each other as a team. By way of example not limitation, once the active shooter 24 is identified by the active shooter response system 10, the drones 16 may be deployed to the active shooter 24. One drone 16 may hover directly over the active shooter 24 to point the pepper spray at the active shooter. This may be done while one or more drones may surround the active shooter 24. As shown in FIG. 7, the drone 16 may have a camera that is slightly in the upwardly tilted configuration. This is due to the fact that when the drone 16 is moving forward, the drone must tilt forwards as shown in FIG. 7 to move forward (i.e., leftward as depicted) and be able to see a forward line of sight. However, when the drone hovers over the active shooter, the camera 30 is pointed in the up direction. The drone that hovers over the active shooter 24 cannot optically see, sense or track the active shooter 24 with its camera sensor 30 and/or infrared sensor. In this regard, the other drones 16 that surround the active shooter 24 can point its camera 30 toward the active shooter 24 to track the active shooter. This may be done by flying lower than the active shooter. See FIG. 11. The drones on the left and right side of the active shooter is lower so that at this low position, the drones camera may be pointed at the person's hands. These drones 16 send data back to the base station 14 which can control the location of the drone 16 hovering over the active shooter 24. If the active shooter 24 moves left or right, front or back, then the drones 16 encircling the active shooter senses those movements, sends the data back to the base station and the base station sends a signal to the drone 16 hovering over the active shooter 24. Because the camera 30 is in the slightly elevated or angled upward direction, the other drones 16 that surround the active shooter 24 may be at or below eye level of the active shooter. In particular, the other drones 16 may be below or at four feet above ground level. Additionally, or alternatively, the drones 16 that surround the active shooter 24 may be pointing toward the active shooter in the sense that the camera 30 can see the active shooter 24 but the drones 16 may be in a landed position so that the drones need not consumer battery while the active shooter is being confined to the particular location by surrounding the active shooter 24 and placing an flying drone 16 direct above the active shooter 24. If the battery of the drone 16 that is flying over the active shooter 24 is low, then that drone 16 can be swapped with one of the other drones. In this regard, the plurality of drones can provide a significant amount of battery management in order to hold the active shooter 24 at the locations for an extended period of time significantly greater than the battery life of any one drone. Moreover, to conserve battery power of the drones, one or more drones can be powered down and land outside of where the drones are circumscribing the active shooter to conserve the battery power of the drone. As the battery power of the other drones go down, the drones that have been shut off may take off to pursue the active shooter. This may be done at the same time that the then currently flying drones are landed and shut off to preserve its own battery power.

It is also contemplated that the drones may have a downward facing camera so that when the drone is hovering over the active shooter that the downward facing camera tracks a location of the active shooter and continue to sense characteristics of the active shooter with its on-drone sensors including but not limited to the audible, visual and infrared sensors.

In another situation, if the active shooter 24 is in a building with all doors and windows in a closed position but the drones 16 are outside of the building, the drones may coordinate with each other to break through a glass window and allow at least one or more of the drones 16 to enter through the broken window. As discussed above, the location of the window to be broken can be retrieved and identified with the topographical map. In particular, the base station may send a signal to the plurality of drones so that the drone that is closest to the window or the one that can gain enough speed rams into the window of the locked building in order to break the window. To assist in breaking the glass window, the drones 16 may have glass breaking tips 36. The glass breaking tips 36 may be affixed to the body of the drone or aligned to the rotational axis of the propellers of the drones 16. When the race drones 16 are flying at a high speed of rate (i.e., 70 to 120 mph), the angle 40 (FIG. 7) of attack is very high if not close to 90 degrees. The drone 16 can speed up and approach the window at a high rate of speed at which the angle of attack 40 is closer to 90 degrees so that the glass breaking tips 36 can contact and break the glass as the drone is flown into the glass window. At this high rate of speed, the glass breaking tips can be aligned to be parallel with the ground so that the glass breaking tips contact a window which is vertically oriented at within an optimal range. The first drone or a few thereafter may be a sacrificial drone which allows the other drones to access the building through the broken window.

Preferably the active shooter 24 is neutralized with a chemical such as pepper spray. To this end, the drone 16 may be retrofitted with one or more pepper spray canisters 38. The drone 16 hovering over the active shooter 24 may release one of more pepper spray liquid, if needed. The pepper spray liquid may be atomized and spread in the area of the active shooter 24. More particularly, when the pepper spray liquid is atomized, the wind displacement caused by the propellers 42 may assist in directing the pepper spray liquid onto the active shooter 24. If the drone 16 hovering over the active shooter 24 releases all of its canisters, then such drone can switch place with another drone 16 which still has charged pepper spray canisters. If all of the drones 16 releases all their pepper spray canisters 38 but the active shooter 24 is still not neutralized, it is also contemplated that the drone itself 16 may ram into the active shooter. It is also contemplated that the drone(s) may ram itself into the active shooter first then release the pepper spray on the active shooter. The drones may weigh about one to five pounds and when they are traveling at a rate of about 50 to 120 miles per hour, they can provide physical damage or a physical defense against the active shooter 24. In this scenario, the drones 16 also cooperate with one another. The drone that is selected to ram into the active shooter 24 may not be able to see the active shooter 24 with its camera 30. The other drones 16 that surround the active shooter 24 may provide the needed location information of the active shooter 24 to the selected drone for ramming. It can fly near but lower than the active shooter so that the drone to be flown into the active shooter receives location data of the active shooter via the sensor of the drones flying adjacent to the active shooter and not from the drone to be flown into the active shooter.

The decision to ram the drones 16 into the active shooter may be an option of last resort since a computerized decision to ram the drone 16 into the active shooter may be an error by the system 10. The system 10 may have erroneously identified a safe person as the active shooter. With the potential for loss of life, the decision to ram the drone 16 into the active shooter may be a manual decision by a police officer or someone that is trained to use the system. Moreover, the decision can be made at a computer terminal or system command in communications with or at the base station 14.

The decision to ram the drone(s) into the active shooter or spray or otherwise neutralize the active shooter may be made by the base station without human intervention. For example, the drones and/or sensors located on the school property may sense that everyone is running away from a particular individual. Or, an infrared sensor may identify a hot barrel of a gun. That individual may be identified as the active shooter by the base station. Or, a combination of these two indicators may identify the individual as the active shooter. The base station without any human intervention may decide to neutralize the active shooter by ramming the drone(s) into the active shooter or spraying the active shooter with the pepper spray. Alternatively, a drone pilot or base station operator may see what the drones are seeing by way of a display which shows the video feed from the drones and sensors on the school property. The drone pilot or the base station operator can identify an individual as the active shooter by touching a touch sensitive screen where the active shooter is located or by using a keyboard and/or mouse to hover over the active shooter displayed on the screen and clicking on the active shooter.

Figure 8:
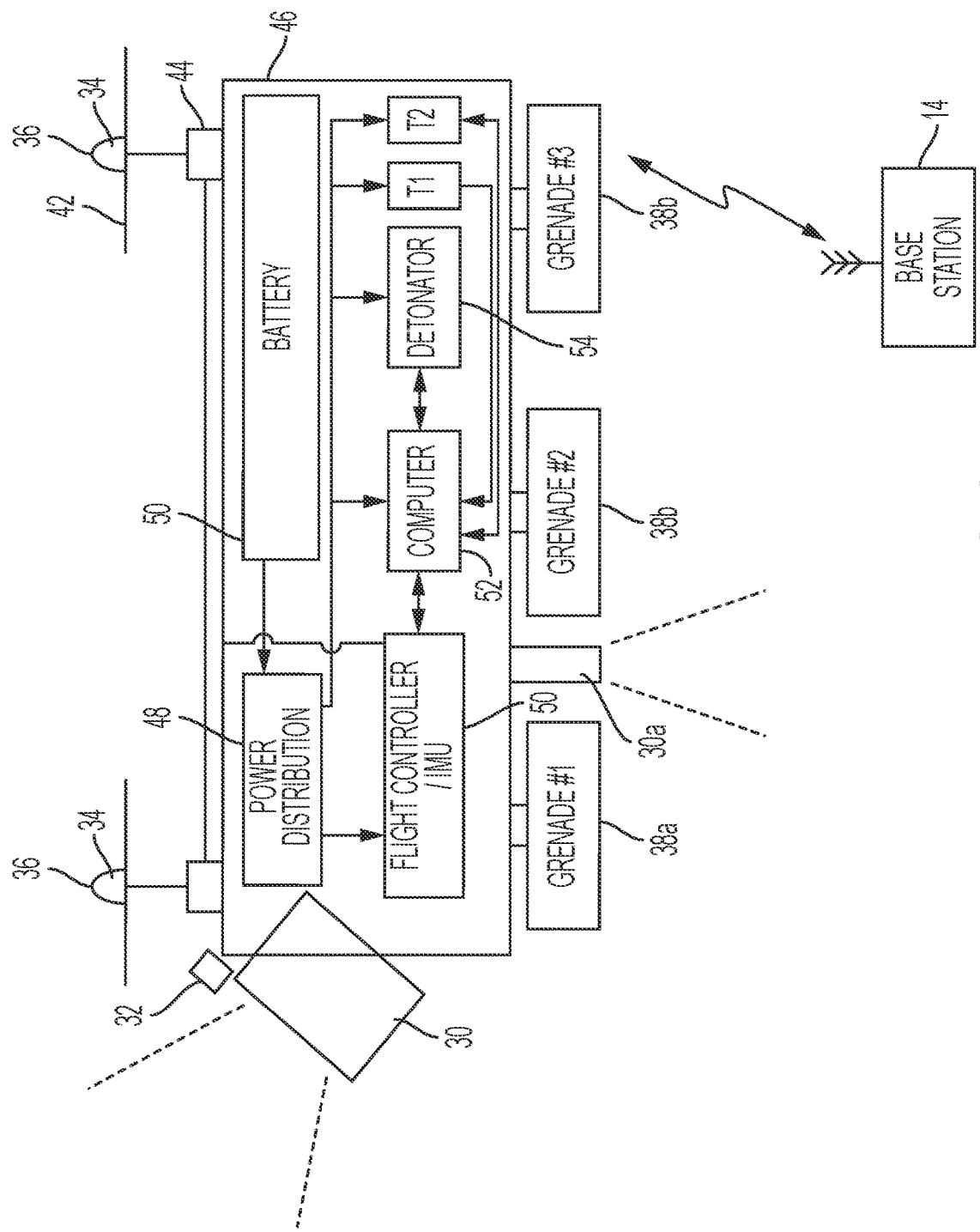
FIG. 8 is a schematic view of the drone.

Referring now to FIG. 8, each drone may have an infrared sensor 32, an optical sensor (i.e. camera) 30 and propellers 42 that are secured to its motors 44 with nuts 34. The nuts 34 may be fitted with glass breaking tips 36. The drone may be mounted or built on a frame 46 having a power distribution module 48, battery 50, a flight controller and inertial measurement unit 50, computer or processor 52, detonator 54, transmitter 56, 58 and one or more pepper spray canisters 38. The transmitter 58 may have bi-directional communications with the base station 14.

Figure 9:
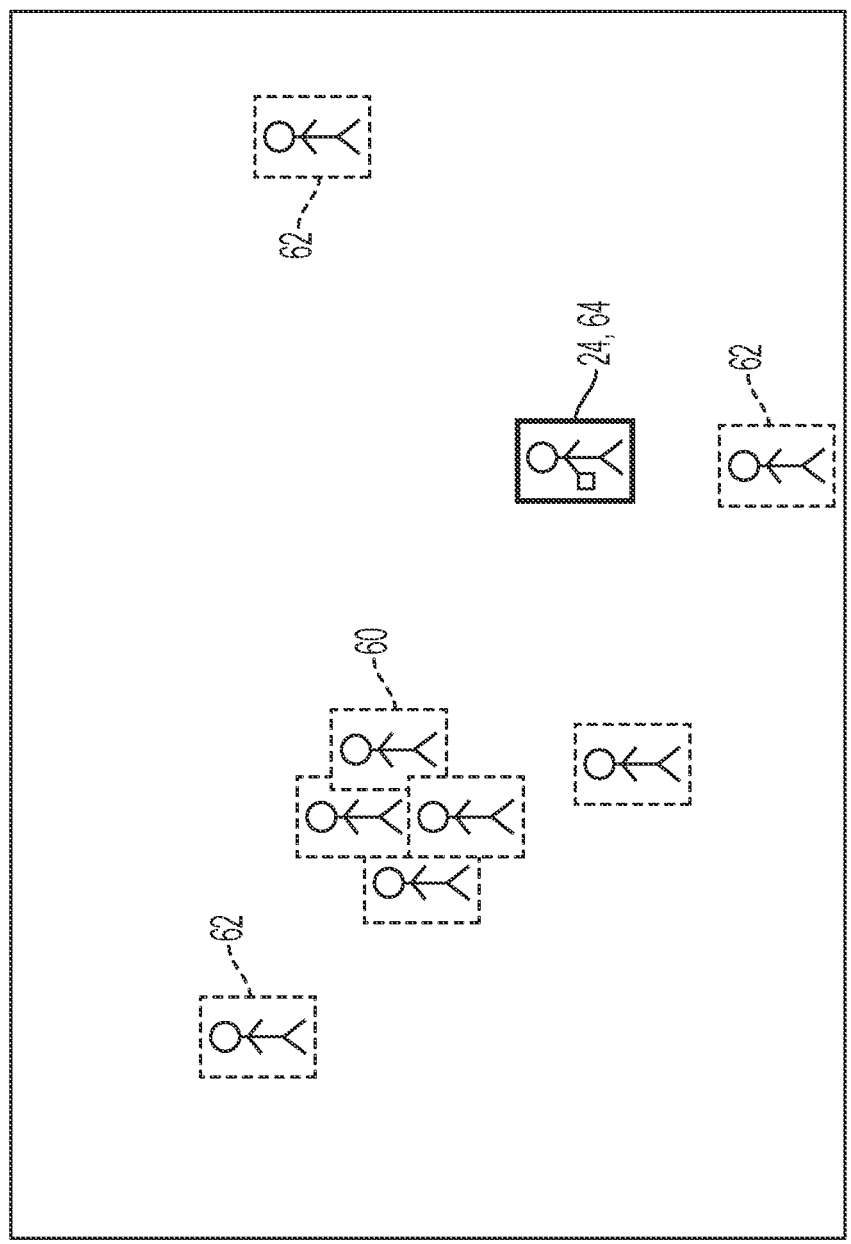
FIG. 9 illustrates a pictorial view of analyzing moving objects (e.g., students, police officers, active shooters) within a monitored area of the school property.

Referring now to FIG. 9, the drones 16 may optically track various moving objects in its optical field of view with the camera 30. The data received from the cameras 30 and infrared sensors 32 of all of the drones 16 may be transmitted back to the base station 14 for processing and sending back signals to control the drones 16 based on the collected data such as in the example above where one drone hovers over the active shooter 24 and the other drones encircling the active shooter provides location data. Also, if multiple drones are spread over a wide area, the drone that senses a characteristic of a gunfire or other threat can wirelessly communicate the data back to the base station. The base station or an operator at the base station can redirect the drones to one or more locations depending on where the threats are sensed.

When an active shooter situation is identified (e.g., when an elevated decibel reading by the acoustic/sound sensors is sensed), a portion or the entire fleet of drones 16 may be deployed. The current deployed drones may be flown to the estimated location of the active shooter 24. At or near the active shooter, all moving objects may initially be identified as a safe target. However, if a heat signature is detected by the infrared sensor 32 by the infrared sensor 32 of the drone 16, the moving object may be categorized as a caution target (i.e., target which will be continuously monitored). The infrared sensors 12c could also locate the active shooter 24 as well and send back data to the base station for identification and continuous monitoring as caution target. Caution target are those targets which the system 10 does not know if they are there to protect students (e.g., police officers, etc.) or to hurt the students (e.g., active shooters).

The safe targets are represented by dash lines in FIG. 9. The target selected for continuous monitoring (i.e., caution targets) is identified by the dash dot lines. If one of the safe targets or the caution targets 62 shoots at one or more of the safe targets 60, then the safe target 60 and/or the caution target 62 may be changed to an active shooter target 64. This is represented by the solid line. The reason is that targets should not be shooting at safe targets 60. If the safe targets and/or the caution targets 62 are shooting at each other, then both targets are labeled as caution targets 62 because it is unclear which is the police officer and which is the active shooter 24. The system can identify the direction in which the firearm is shot by analyzing movement of the people with respect to each other and to the structures.

The data processing may occur at the drones themselves or at the base station. The base station may be a computer or a computer linked to a cloud-based computing processor. The base station may process the data from the sensors and/or drones or receive processed data from the cloud-based computer of the sensors and/or drones. The base station may control the drones based on the processed data.

Figure 3:
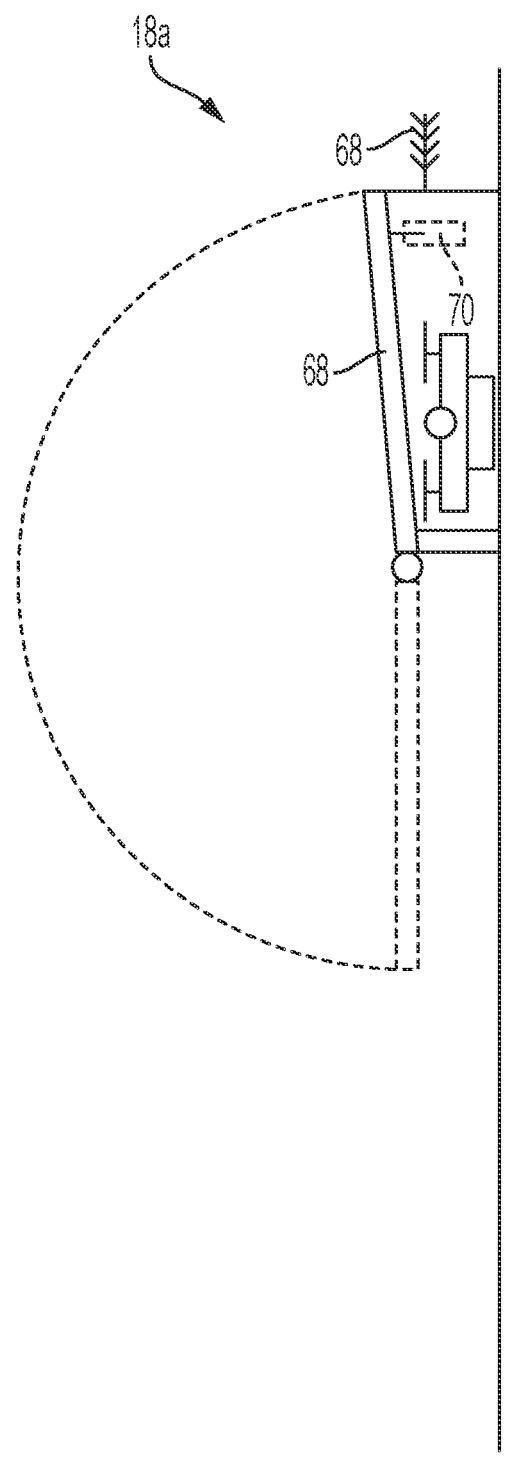
FIG. 3 illustrates a drone disposed within a hardened enclosure mounted to a wall.
Figure 4:
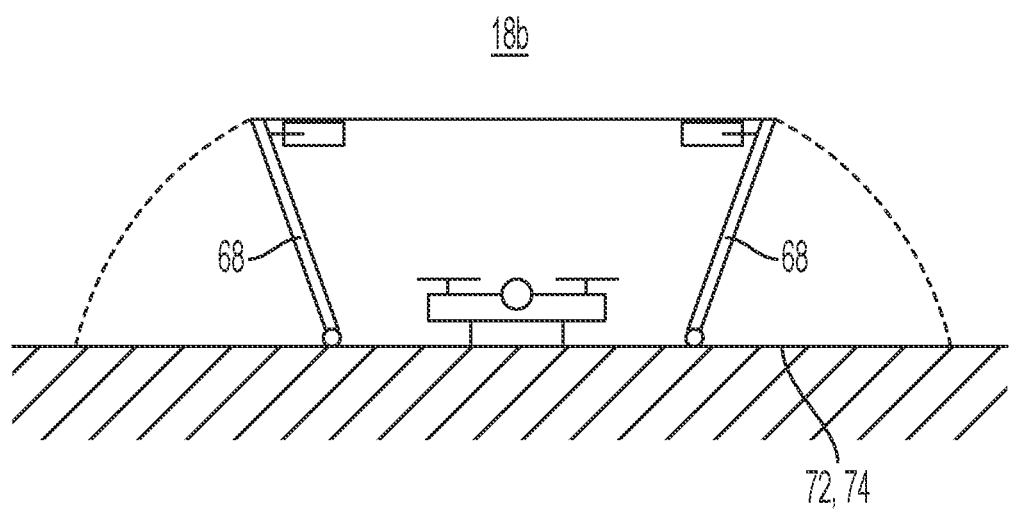
FIG. 4 illustrates a drone mounted to a wall or horizontal surface disposed within a hardened enclosure.
Figure 5:
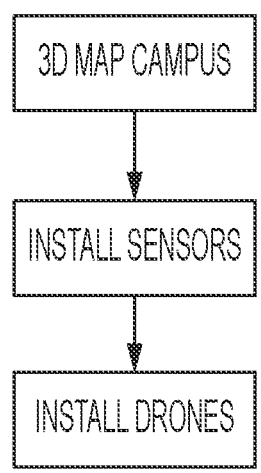
FIG. 5 illustrates a flow chart for installing the active shooter response system on the school property.

The drones 16 may be secured in a drone enclosure 18. Various drone enclosures 18 are contemplated. Referring now to FIG. 3, the drone enclosure 18a may be mounted to a wall 66. The drone enclosure 18a may have a wireless transmitter 68 that communicates with the base station 14 and relays information between the base station 14 and the drone 16 contained within the drone enclosure 18a. The drone enclosure 18a may have a hardened exterior that is bullet proof or bullet resistant. The drone enclosure 18a may have a spring activated door 68. The door may be hinged on its bottom side so that gravity can help open the door when its latch is released. Moreover, the latch 70 may have a spring that pushes or forces the door 68 open to further speed up the opening of the door 68 in order to minimize time for the drone 16 to fly out of the enclosure 18a. The door 68 may be tilted at an angle so that once the latching mechanism 70 is disengaged, the door 68 will eventually fall due to the weight of its self and by gravity. In the event of mechanical failure, the only thing that needs to happen for the door to open is the latch must be released. The drone may be mounted into the enclosure in the orientation shown in FIG. 12, as shown in FIG. 3. Referring now to FIG. 4, the drone enclosure 18 may be mounted to a ground 72 or a roof top 74. The enclosure 18b may have two doors 68 and operate in the same manner compared to the door of enclosure 18a.

Figure 12:
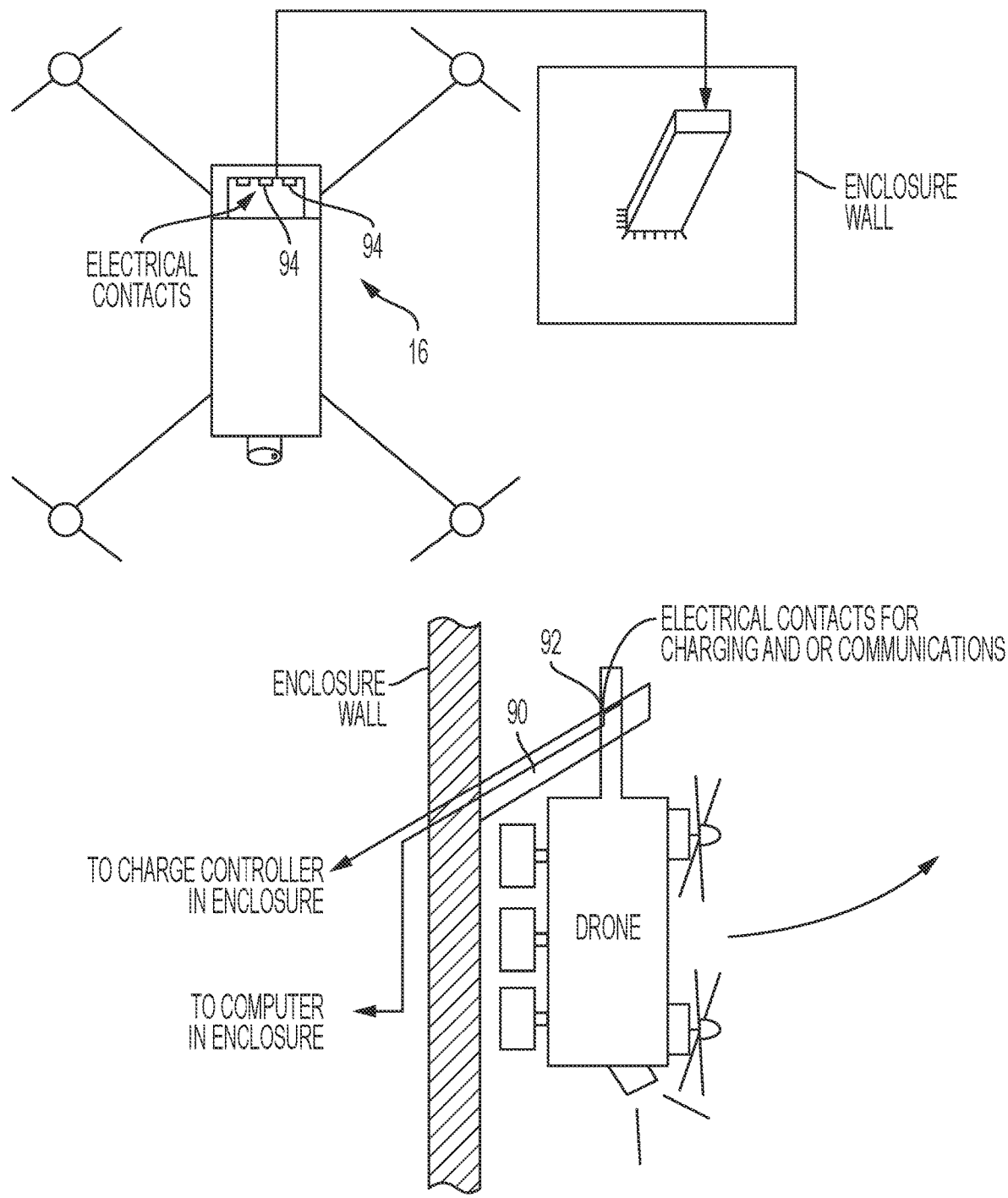
FIG. 12 illustrates a drone hanging vertically from a vertical surface and having its battery charged while in storage in a hardened enclosure.
Figure 13:
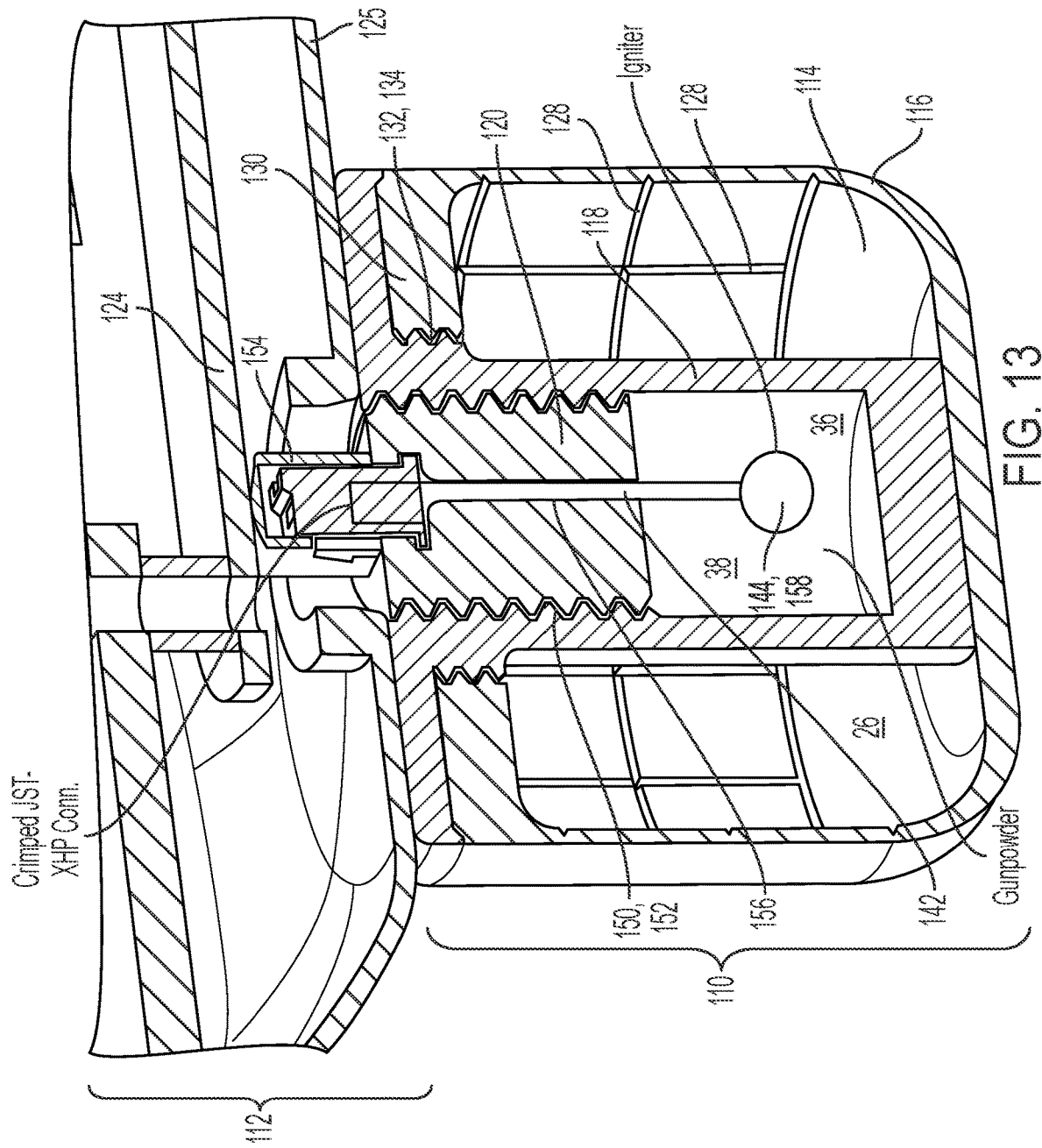
FIG. 13 is a cross sectional view of an assembled explosive canister.
Figure 14:
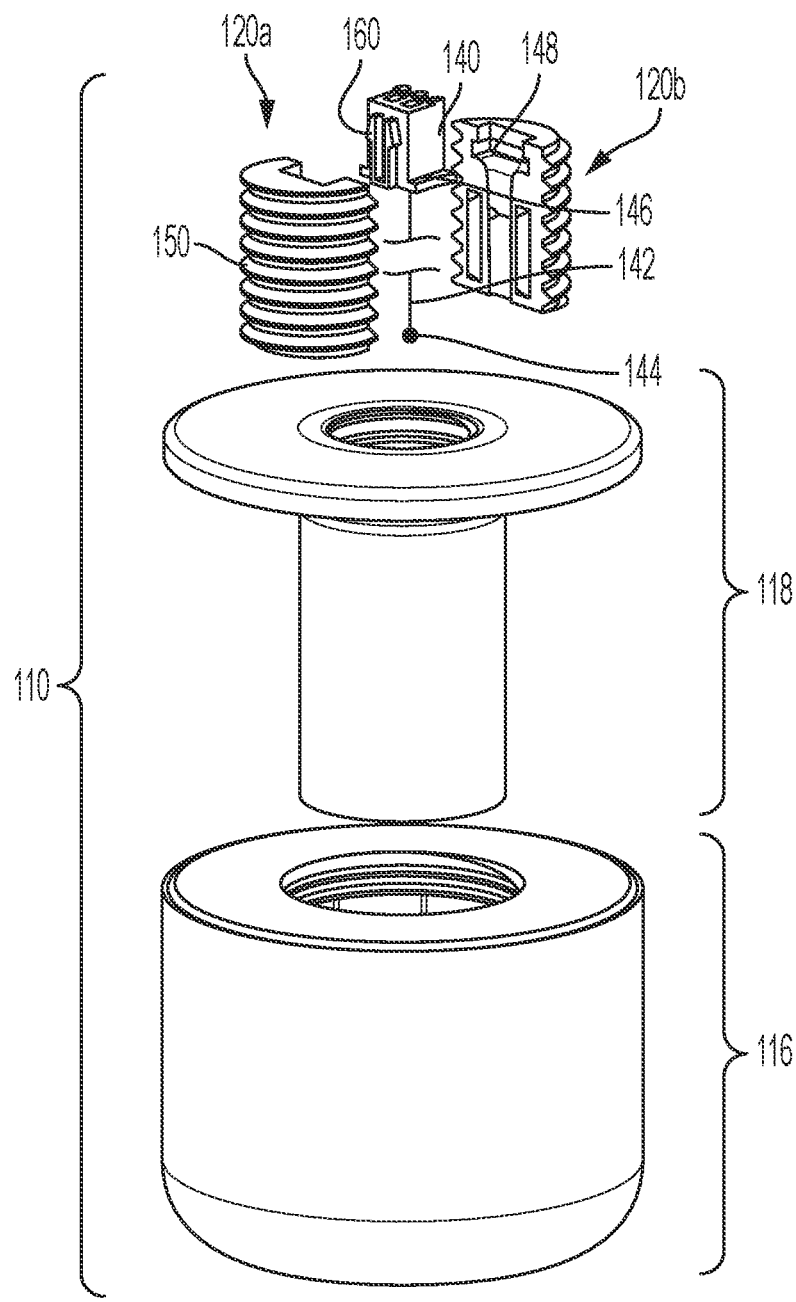
FIG. 14 is an exploded perspective view of the explosive canister.
Figure 15:
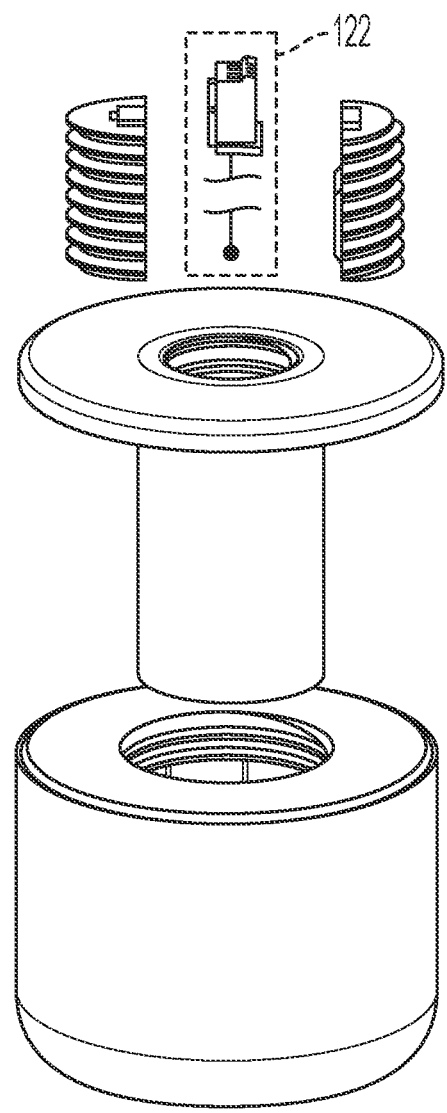
FIG. 15 is another exploded perspective view of the explosive canister.
Figure 16:
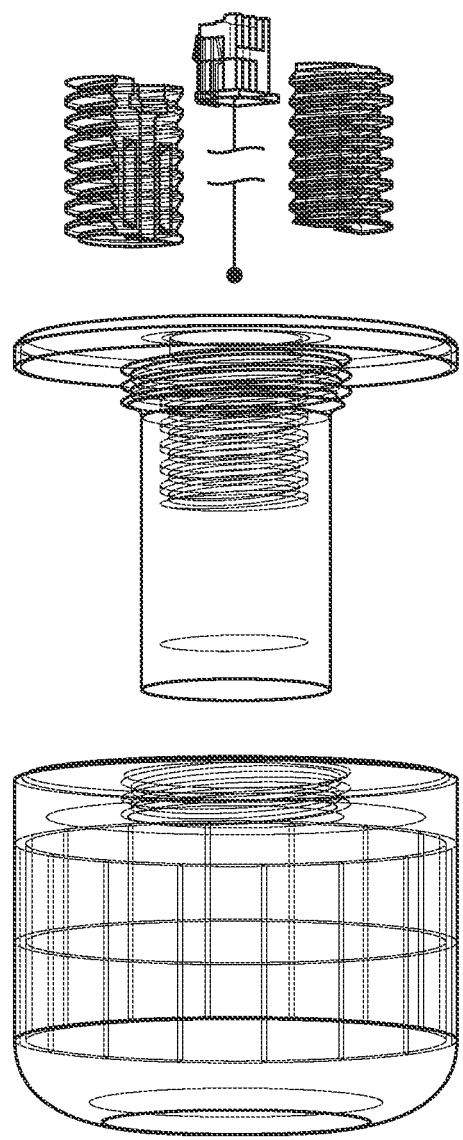
FIG. 16 is another exploded perspective view of the explosive canister.

Referring now to FIG. 12, the drone 16 may hang on a vertical surface 88. The drone may be enclosed within an enclosure as shown in FIG. 3 with a gravity falling door. The vertical surface 88 may be a vertical surface of the enclosure 18a, 18b. A stud 90 may have one or more electrical contacts 92 and have power routed to the electrical contacts 92. The drone 16 may have a plurality of corresponding electrical contacts 94. The drone 16 may be hung on the stud and when doing so, the corresponding electrical contacts 94 may contact the contacts 92 which provides power and recharges the rechargeable battery of the drone 16. The contacts can also provide a communication link to the base station where the drone's internal system status can be stored and evaluated. The various maneuvers performed by the drone 16 may be controlled by drone pilots or a computer program of the base station 14, which communicates with the drones 16. The drones 16 may be in communication with the base station 14 to relay information sensed by the drone sensors and the sensors distributed throughout the protected area so that the base station 14 can coordinate the activities of the drone or drones 16. The base station 14 can communicate and automatically (i.e. without user intervention) control the drones 16 to neutralize or mitigate the actions of the active shooter 24. The sensors 12 can also communicate directly with the base station or indirectly with the base station via the drone.

Referring now to FIGS. 13-16, an explosive canister 100 attachable to a drone 112 is shown. The explosive canister 100 may be attached to a bottom side of a drone 112 and contain a repellent 114. The drone 112 may be maneuvered toward a person who may be a threat to him or herself or to others. The explosive canister 100 may be exploded near and preferably at the person in order to release the repellent 114 on the person to neutralize the person. When the repellent 114 contacts (e.g., inhaled or contacts the skin of the person) the person, the repellent 114 serves to stop the person from being a threat to him or herself or to others.

The explosive canister 100 may include a repellent canister 116, a gun powder canister 118, a split screw 120, and a connector 122. Additionally, the drone may have an electrical circuit board 124 and a body 125.

The repellant canister 116 may define an interior volume 126. The size of the interior volume 126 may be sufficiently large so as to hold enough repellent 114 in order to stop a three hundred (300) pound male individual. An interior surface 126 of the repellent canister 116 may have frangible lines 128 that circumscribed the entire lower portion of the repelling canister 116. A flange 130 of the repelling canister 116 does not have any frangible lines or grooves 128 so that when the explosive canister 100 explodes, such explosion does not penetrate the body 125 of the drone 112. The repellant canister 116 may be fabricated from a generally rigid material including, but not limited to plastic. However, it is also contemplated that the material of the repellant canister 116 may include other flexible material including, but not limited to film, plastic film, or other flexible membranes. If the repellant canister 116 is fabricated from a flexible membrane, then the flexible membrane may be secured to a rigid flange 130. The flange 130 may have internal threads 132 that meet with external threads 134 of the gun power canister 118.

The repellent material 114 may be a liquid repellent material, a powder repellent material or a combination thereof. By way of example and not limitation, the repellent material 114 may be a pepper spray. Additionally, the material contained within the repellent canister 116 may, in addition to or alternatively, from the repellent material be a marking material (liquid or powder). In this regard, when the explosive canister 100 is maneuvered to the person, the goal is not to stop the person but to mark the person so that the others (e.g., police) can identify the person when the police arrives.

The gun powder canister 118 may also have an interior volume 136 sufficiently large to hold enough explosive (e.g., gun powder, pyrotechnic flash powder, lead azide, lead styphnate, nitramide such as a RDX or cyclotrimethylenetrinitramine, pentaerythritol tetranitrate) 138 to burst open the gun powder canister 118 as well as the repellent canister 116. Gun powder 138 may be placed in the interior volume 136. The interior volume 136 of the gun powder canister 118 may be closed off with the split screw 120 and the connector 122. To do so, the connector 122 may have an electrical connector 140, an electrical wire 142 and an igniter 144. The electrical connector 140 may have a flange 146 which may be received into groove 148 of the first and second parts 120a, 120b of the split screw 120. The split screw 120 may be assembled together around the electrical connector 140 with the flange 146 disposed within the groove. When this is so, the electrical connector 140 cannot be removed from the split screw 120. The threads 150 of the split screw 120 may be threaded into the internal threads 152 of the gun powder canister 118.

A through hole 156 may be formed in the split screw 120 to allow for passage of the electrical wire 142. The length of the electrical wire 142 may be sufficiently long so that the igniter 144 is disposed within the gun powder 138 when assembled. Prior to screwing the split screw 120 onto the gun powder canister 118, a flammable paste 158 may be placed over the igniter 144. The igniter 144 may be a heating element which heats up when the electrical circuit board 124 sends a short circuit to the igniter 144. The flammable paste 158 may be a material that ignites when exposed to a low temperature. For example, the flammable paste 158 may ignite and burn when exposed to a temperature at or above 180 or 300 degrees Fahrenheit. The igniter 144 is capable of being heated to the minimum temperature at which the flammable paste will ignite.

Once the flammable paste burns, the fire from the flammable paste 144 will ignite the gun powder 138 and explode the gun powder canister 116 and the repellent canister 116. The electrical connector 140 may be inserted into a female receptacle 154. The female receptacle 154 may be in electrical communication with the electrical circuit board 124. When the electrical connector 140 is inserted into the female receptacle 154, the electrical circuit board 124 is placed into electrical communication with the igniter 144 via the female receptacle 154, the electrical connector 140, the electrical wire 142. Moreover, when the electrical connector 140 is inserted into the female receptacle 154, the electrical connector 140 may have a latch 160 that catches a lip within the female receptacle to hold the explosive canister 100 to the drone 112.

Upon assembly, the explosive canister 100 may be disposed an underside of the drone 112. When a person is identified as a threat, the drone 112 may be dispatched to the person. The drone 112 may be maneuvered so that a vertical axis 162 of the drone 100 is pointing toward or intersecting the person. At this moment, the electrical circuit board 124 may send a signal to heat up the igniter 144. The igniter 144 heats up and causes the flammable paste 144 to burn. Upon the flammable paste burning, the gun powder 114 is ignited which bursts open the gun powder canister 118 and the repelling canister 116. The repellent 114 is aimed and shot toward the person. The propellers of the drone 112 further assist in pushing the repellent material toward the person.

The vertical axis of the drone may be an axis normal to a plane in which the propellers of the drone 112 are spinning.

Figure 17:
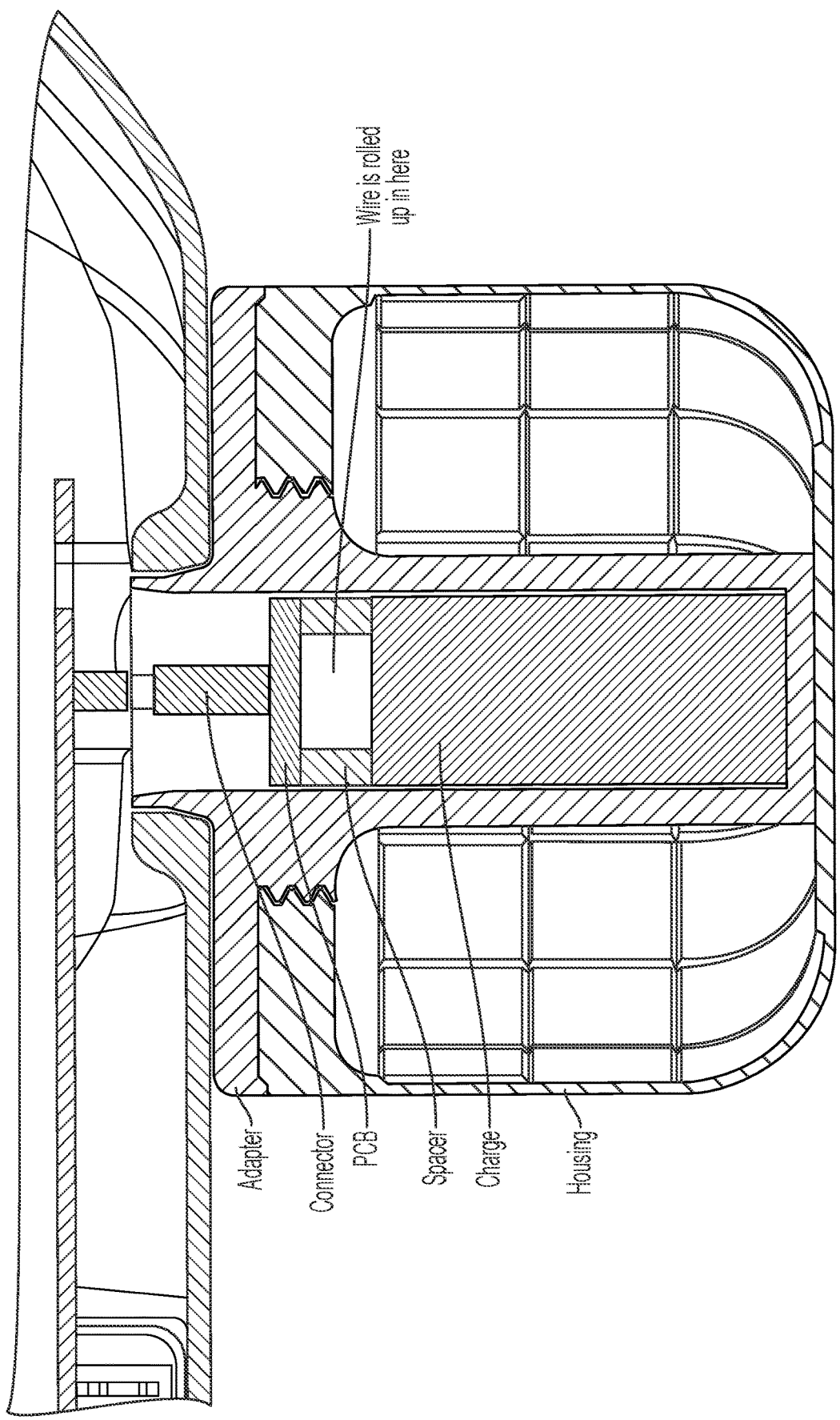
FIG. 17 illustrates an alternate embodiment of the canister.

Referring now to FIG. 17, an alternate configuration for the explosive canister is shown. The explosive canister is similar to the explosive canister shown in FIG. 13 but utilizes a different chamber design. The printed circuit board (PCB) may be installed above an explosive charge to assist in building pressure once detonated. The spacer may serve to provide a gap between the PCT and the explosive charge so that excess wire may be rolled up into it, if needed. The wire may be used to connect the detonation charge to the PCB. Other ways for connecting the detonation charge to the PCB are also contemplated.

Figures 17A, 17B:
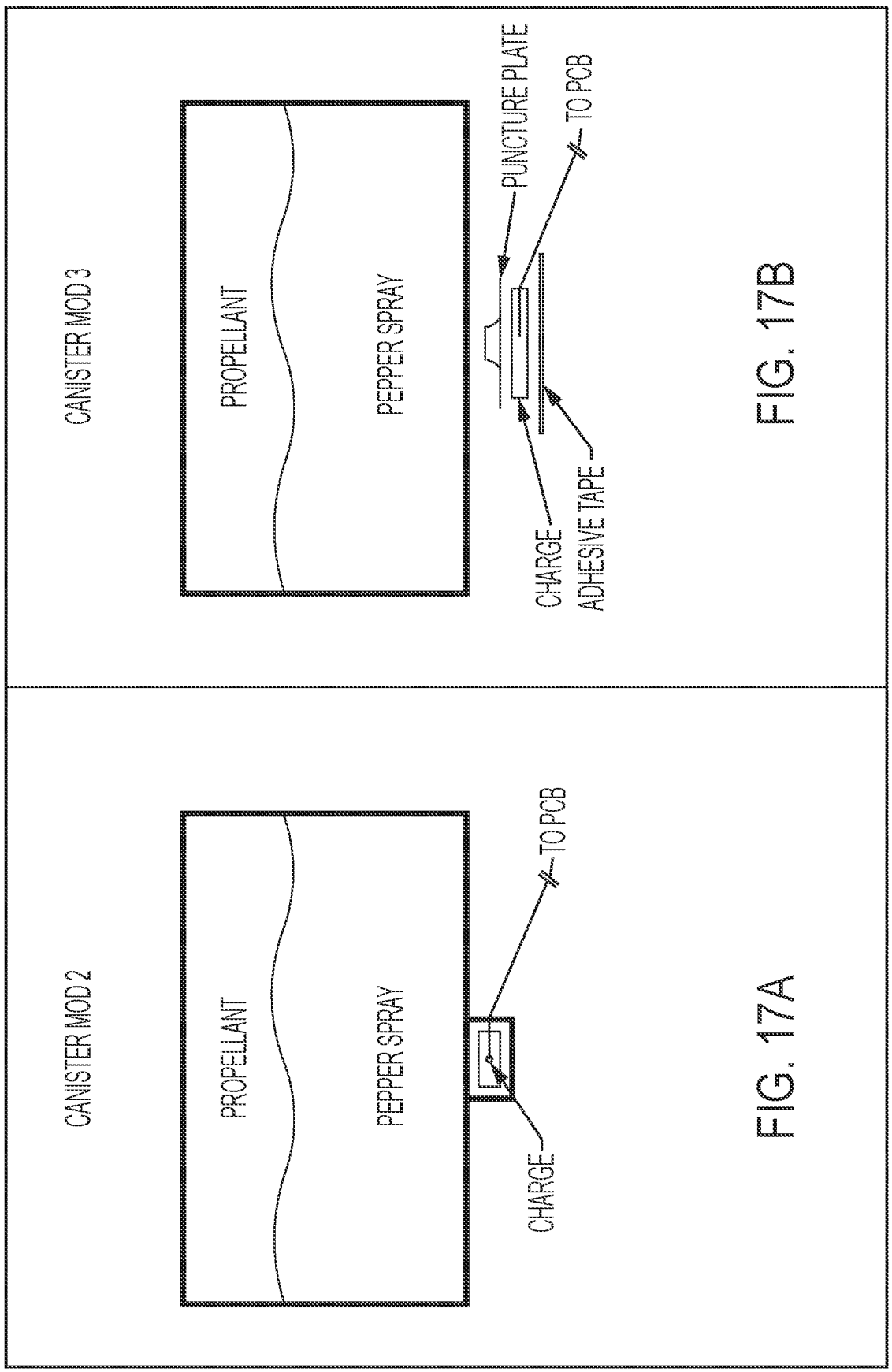
FIG. 17A illustrates a further alternate embodiment of the canister.
FIG. 17B illustrates a further alternate embodiment of the canister.

FIG. 17A shows a canister that uses both a mechanical (propellant) and chemical (explosive charge) energy to release the agent (e.g., pepper spray, marking agent). The contents of the canister may be pressurized by a propellant gas. An explosive charge may be detonated by the PCB. The canister wall and the charge housing may be ruptured upon detonation. This may allow the propellant to force the contents out.

In FIG. 17B, the contents of the canister may be pressurized by a propellant gas. A puncture plate may be placed against a weakened canister wall. An explosive charge may be affixed to the puncture plate with adhesive tape as an example. The PCT may detonate the charge forcing the puncture plate through the canister wall, which may allow the propellant to force out the agent.

The following are also contemplated in relation to the explosive canister. The explosive canister may use an electrical current (from the drones computer) to trigger an explosive charge that opens a pressurized canister. This lets us avoid the added weight of servos or actuators to release the contents. This method also allows us to release the contents very fast.

Referring now to FIG. 17A, the canister may contain the pepper spray/pepper powder or noxious gas. The contents may be forced out by a propellant gas. The charge may be secured by a housing that focuses the blast into the canister and housing opening. Both the charge housing and the canister wall can have relief cuts to ensure proper opening.

Referring now to FIG. 17B, the contents of the canister may be pressurized by a propellant gas. The charge is placed over a puncture plate and held in place by an adhesive tape. The puncture plate has a sharpened opening in the center that extends upwards from the plate, it focuses the explosive energy into the wall of the canister.

In both FIGS. 17 A and 17 B, the charge is electrically connected to the PCB of the drone. The battery of the drone provides the electrical charge to the charge so as to ignite the charge and explosively open the canister.

Figure 18:
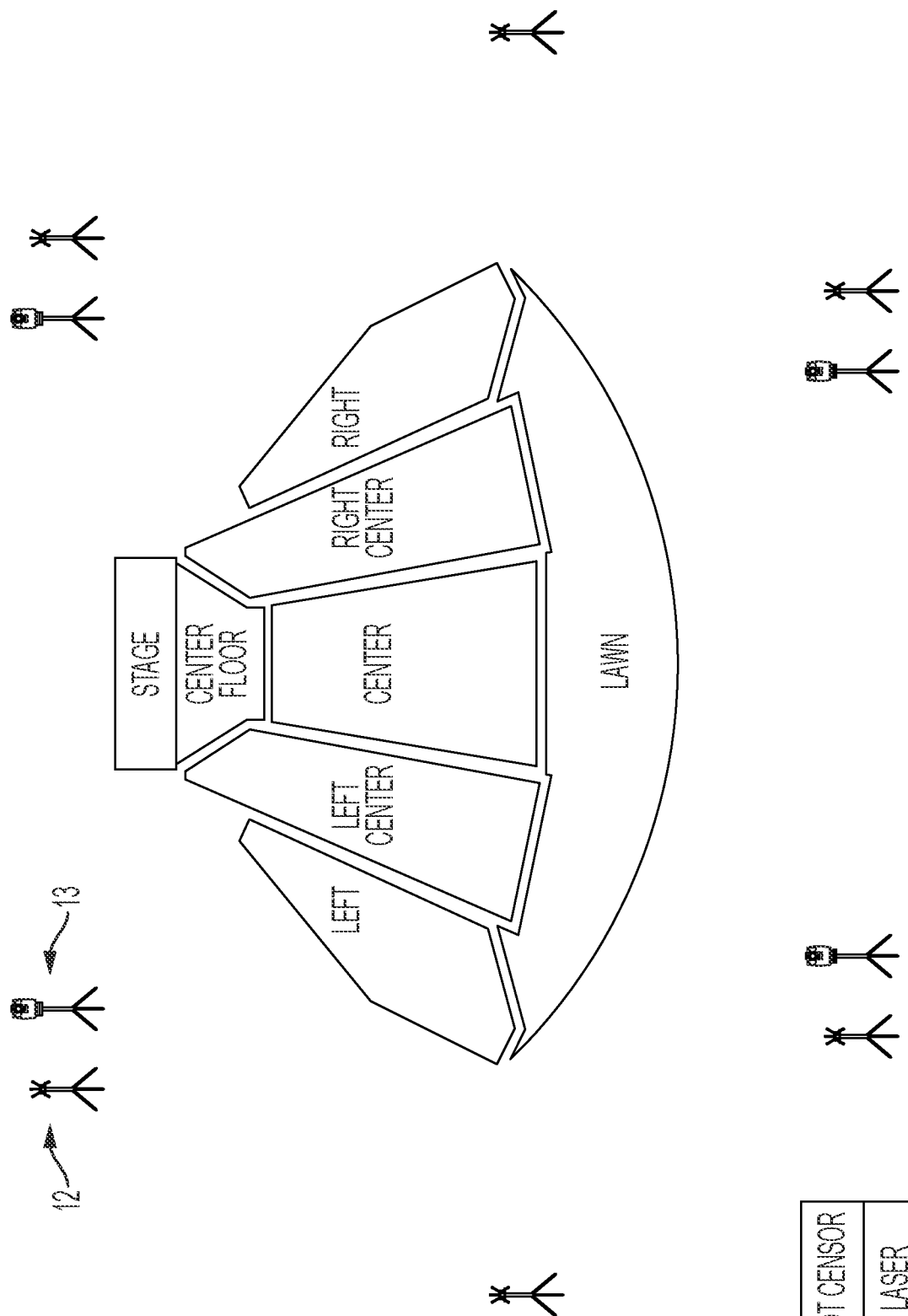
FIG. 18 illustrates a possible scenario.
Figure 19:
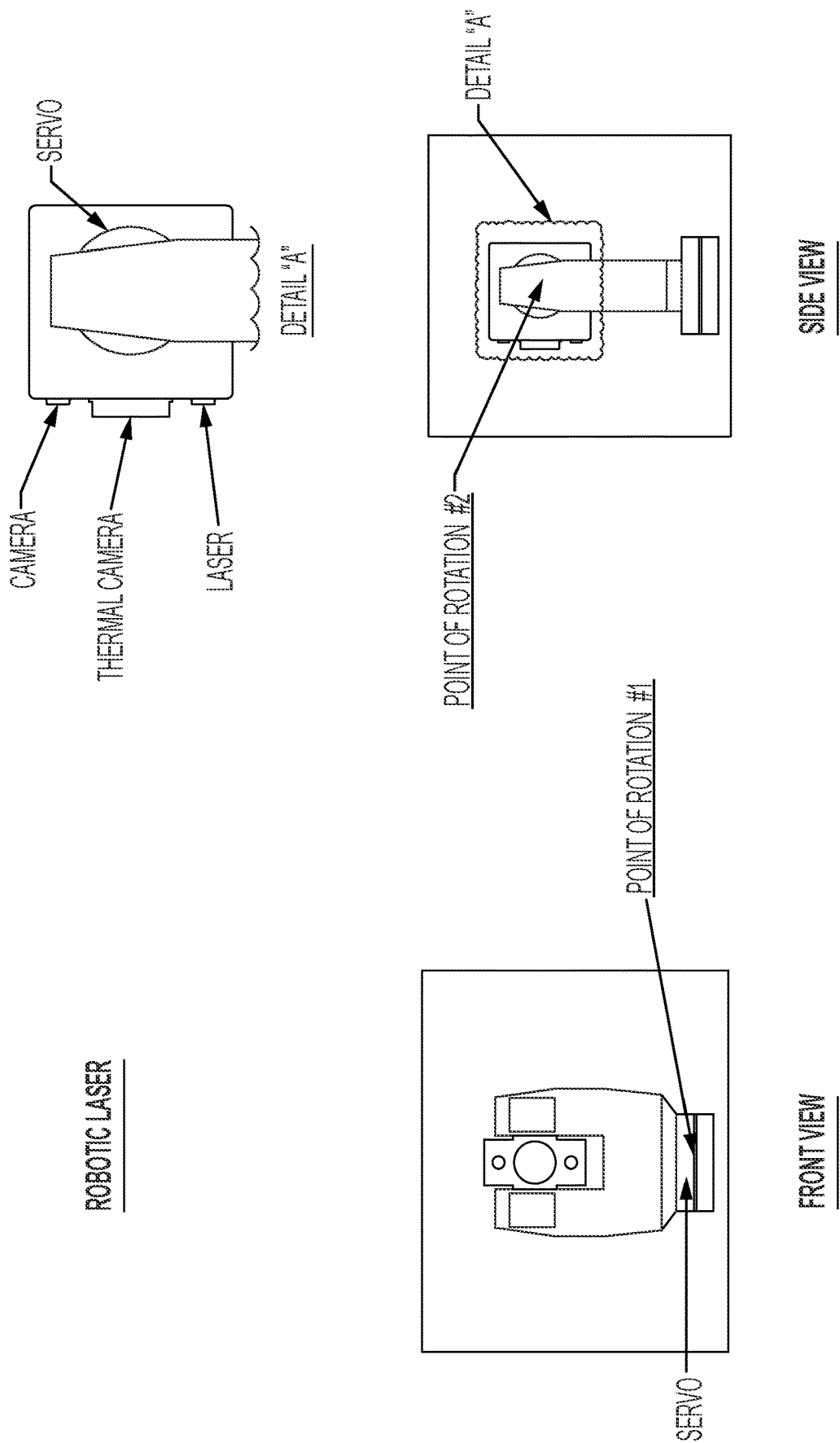
FIG. 19 illustrates a robotic laser for guiding the drone.

Referring now to FIGS. 18 and 19, a robotic laser for guiding a drone to a location is shown and will be discussed below.

This system may be used to stop a sniper firing onto a crowd from an elevated position.

An operator may remotely control and monitor multiple laser mounted robotic gimbals 13 from a control room (onsite or via an internet connection). A computer processes data from gunshot sensors 12 (acoustic or optical) located about the room and can aim the robotic gimbals 13 towards the shooters estimated location. The robotic gimbals may be equipped with thermal sensors, cameras, visible lasers (dazzlers) and a non-visible laser designator. The gimbal may be placed on an elevated location (near a mass of people) pole, concert stage, building, tethered drone etc.

If shots are fired, the computer may automatically (i.e., without user intervention) rotate the gimbal 13 toward the estimated location of the sniper, while the computer notifies the operator that gunfire has been registered. The computer may receive the sensed gunshots through the sensors 12 and triangulate the location of the gunfire or locate the gunfire based on a gunshot sound profile. The computer then controls the gimbals 13 and directs the lasers of the gimbals to the location of the sniper. The operator then takes control of the robotic gimbal, using the camera suite to find the shooter. Once located, the operator triggers the lasers and can launch the drones that are the closest to the gunmen. The lasers can also be set to distract the sniper and can temporarily blind the gunmen, while the drones use the laser to guild their non-lethal payload to the target. Although the payload of the drones are preferably nonlethal, it is also contemplated that the payload of the drones discussed herein may be lethal (e.g., explosion, projectile, poisonous gas or spray).

The drones can also be controlled by the base station or computer within the control room of the venue via a wireless communication (e.g., radio link). In this method, the computer uses the gimbal's camera suite to visually track and maneuver the drones to the target.

The drones can also be piloted manually (by humans within the control room), using the visible laser to help them navigate to the target. The drone's camera may sense the location of the laser and guide itself toward the laser.

The computer can also calculate the GPS coordinates of the sniper using the coordinates of the gimbal, the horizontal azimuth, vertical azimuth and distance (measured with laser) measured by the gimbal. The snipers' location can be accessible to law enforcement via a mobile application that overlays the gunmen's location onto a map. If drones have entered the snipers' room via the window, the camera feed from the drones can also be accessible via the mobile application. This allows law enforcement to inspect the inside of the shooters' room prior to entering.

The operator may have communication equipment to coordinate a response with law enforcement and security personnel. For concert venues, the operator may control the events' public announcement system to communicate with the audience during an emergency.

Benefits include but are not limited to 1) laser guiding the drones to the shooters' location reduces the processing payload on the drone's computer or the base station computer 2) allows for more reliability because security professionals are now in control of designating the target and launching the drones, 3) allows one operator to control multiple robotic gimbals and multiple drones while not being a pilot for any single drone, 4) the laser dazzler can be used to disorient the shooter, stopping the attack temporarily, 5) anyone at the venue can look up and see where the sniper is firing from and can find suitable cover faster, and 6) law enforcement can locate and engage a sniper more quickly thereby reducing the amount of counter sniper police needed to protect an event.

Referring now to FIGS. 20-26, tactics for drone use is shown and will be described below.

Figure 20:
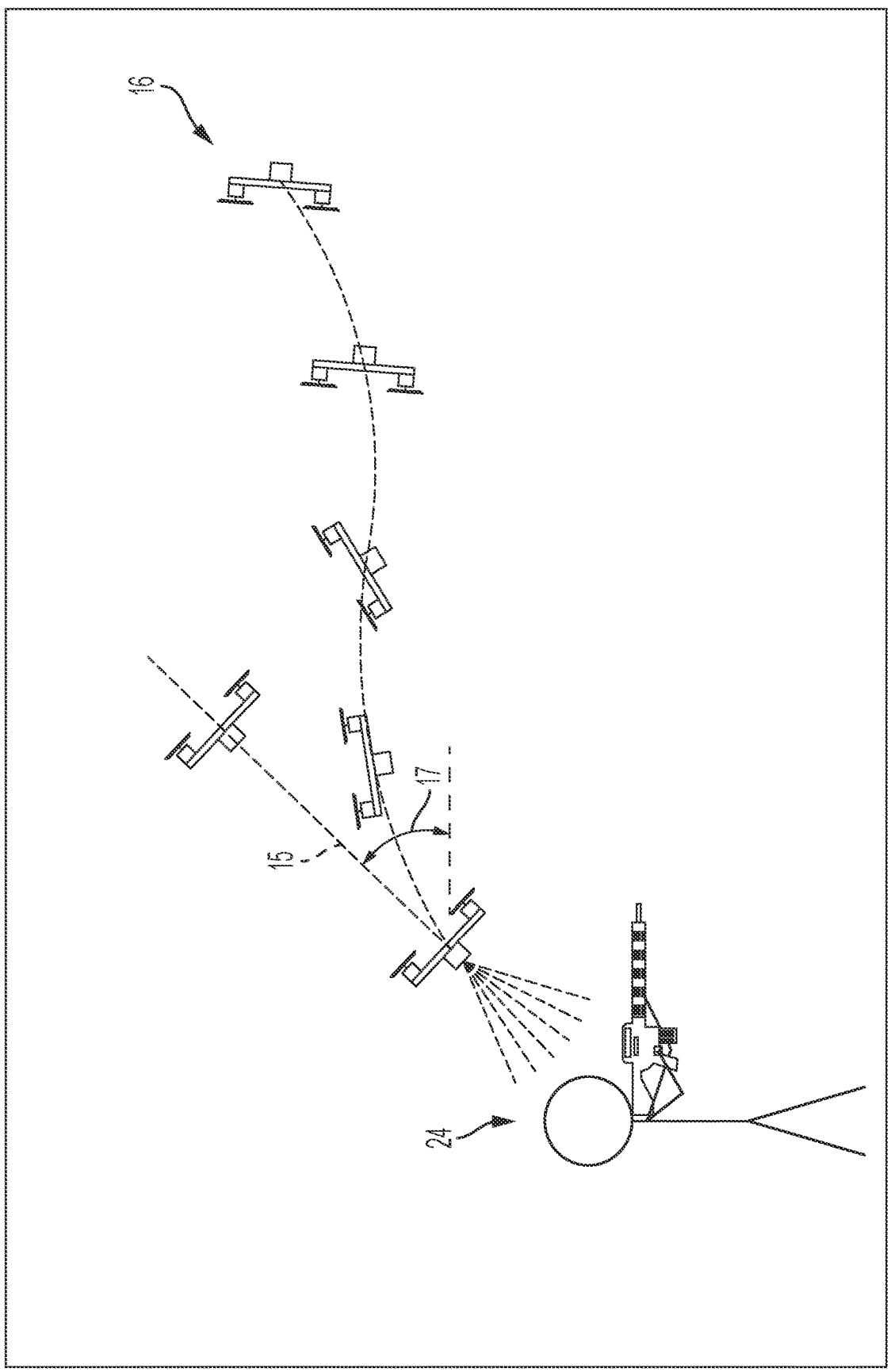
FIG. 20 illustrates a tactic for drone use.

FIG. 20 illustrates drone tactic for distracting the person being a threat. For example, the drone may fly toward the shooter, within the shooters line of sight while maneuvering erratically. The drone may be controlled automatically by the base station or a drone pilot. The drone may come within 3 to 5 feet of the active shooter. The erratic movement may be up and down movement above the active shooter. The erratic movement may also be pitch, yaw and roll movements to make the drone harder to shoot. Also, because the drone is in the shooters line of sight (or field of view), the active shooter's attention and/or gunfire is directed away from people and to the drone. The drones flight path elevation may be higher than the shooter's so that any gunfire directed at the drone is angled upwards and away from bystanders behind or in front of the drone. The drone may fly above 10 feet off of the ground where the active shooter is standing. Drawing the shooter's fire and or attention stops people or law enforcement from being targeted. This tactic also forces the shooter to stand in place as they steady their aim to shoot down the drone flying toward them. With the shooter standing still or in place, they are an easier target for the other drones arriving from different directions. Moreover, the drone 16 may fly toward the shooter 24 to shoot the pepper spray at the active shooter. As the drone approaches the active shooter, the pepper spray may be directed away from the shooter 24 as illustrated in the right most pictured drone 16 in FIG. 20. However, as the drone 16 approaches the shooter 24, the drone 16 may lift up and away from the shooter 24 as shown by travel direction 15 to align the spray direction of the pepper spray device toward the active shooter. As the drone 16 approaches the shooter 24, the drone pilot may identify the active shooter. The active shooter may be visible in the display at the base station or of the drone. Once the active shooter is in the cross hairs, the drone pilot or base station may trigger fire. After pressing the "fire" button, the drone 16 may then automatically take over and come close enough to the shooter 24 by way of proximity sensors or camera sensors then fly up and away at the proper angle 17 from horizontal in order to optimally shoot the pepper spray toward the shooter 24. The propellers of the drone 16 further accelerates the speed at which the pepper spray is directed toward the shooter 24 and the dispersion of the canister contents.

The timing of the detonation of the canister may be accomplished in the following way. The base station computer or an onboard computer of the drone may determine an optimal detonation point based on inputs from the drone's sensors. For example, the drone's sensors (e.g., proximity sensor, camera) may determine a distance between the drone and the person to be neutralized. The drone may detonate the canister 1) as the drone passes the person to be neutralized, 2) as the drone approaches then flies up and away from the person to be neutralized or 3) as the drone is hovering over the person to be neutralized. The computer at the base station or onboard the drone may instruct the drone to adjust its speed to adjust the angular attack of the drone to be optimal. The computer may instruct the drone to detonate the canister when a vertical axis of the drone is aligned to the person to be neutralized while accounting for speed of the drone. At the base station, the operator can identify the person to be neutralized by indicating so on a computer display. Once the person to be neutralized is identified, then the computer at the base station or the drone's computer can calculate the time of detonation and the maneuver that the drone must make to align the vertical axis of the drone for optimal detonation so that the deterring agent is directed toward the person to be neutralized.

Figure 21:
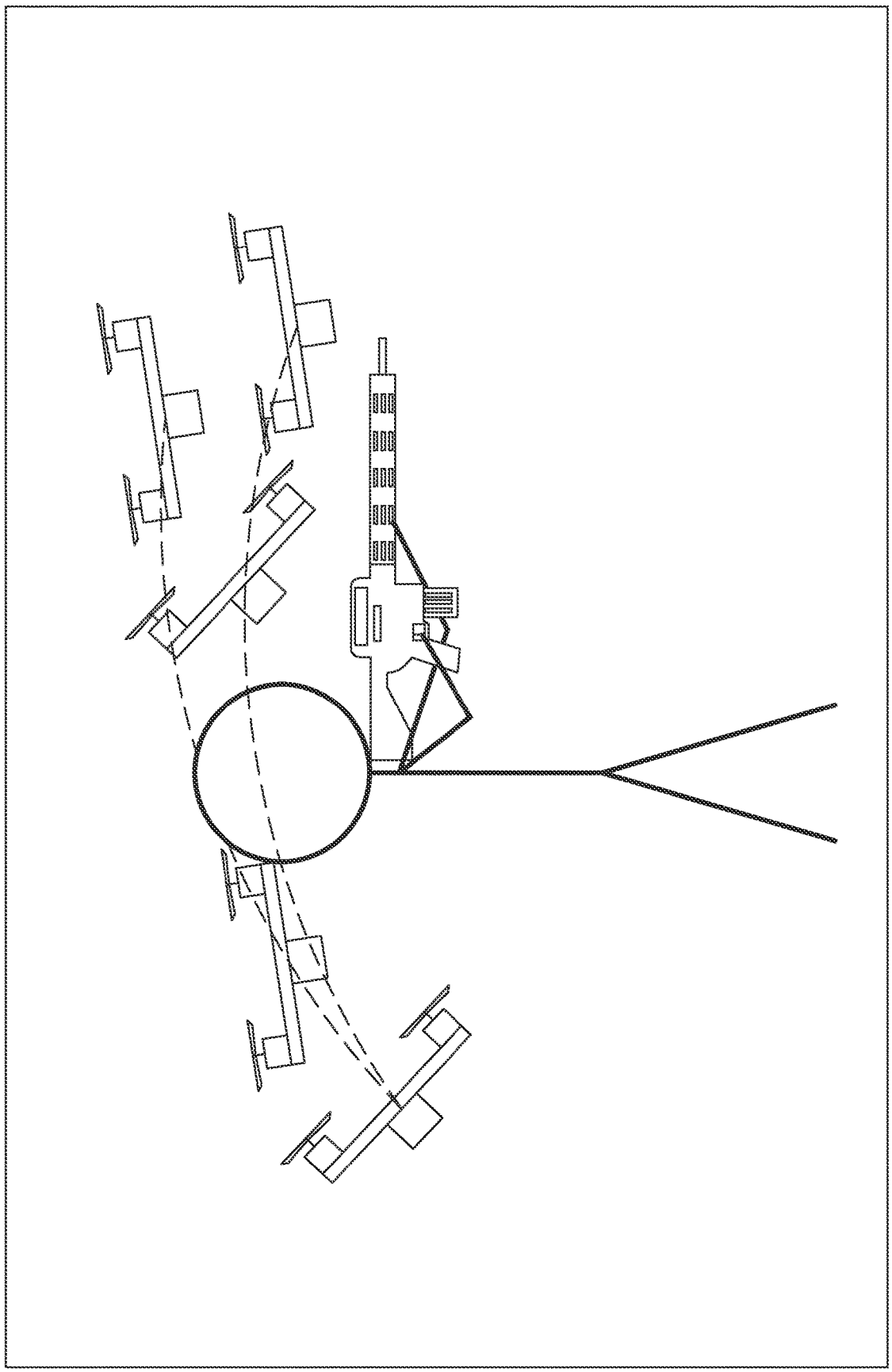
FIG. 21 illustrates a further tactic for drone use.

FIG. 21 illustrates drone tactic for harassing the person being a treat. The drone may fly in close proximity of the shooter's head and attempts to make contact with the propeller blades to the shooter's face or head. For example, the drone may come closer than 3 feet of the active shooter. The maneuver may be conducted at slower more controlled speeds (e.g., under 10 miles per hour) that allows the drone to make quick and erratic directional changes, similar to how a fly buzzes around a person's face. The goal for this maneuver is to take the shooters attention away from engaging people or law enforcement and focusing on dodging the drone's blades. Also, the drone can potentially incapacitate the active shooter with a strike of the propeller of the drone. The drone may be controlled by the base station or a dedicated controller for the drone. It is also contemplated that the rotating blades may be used to attack the active shooter.

Figure 22:
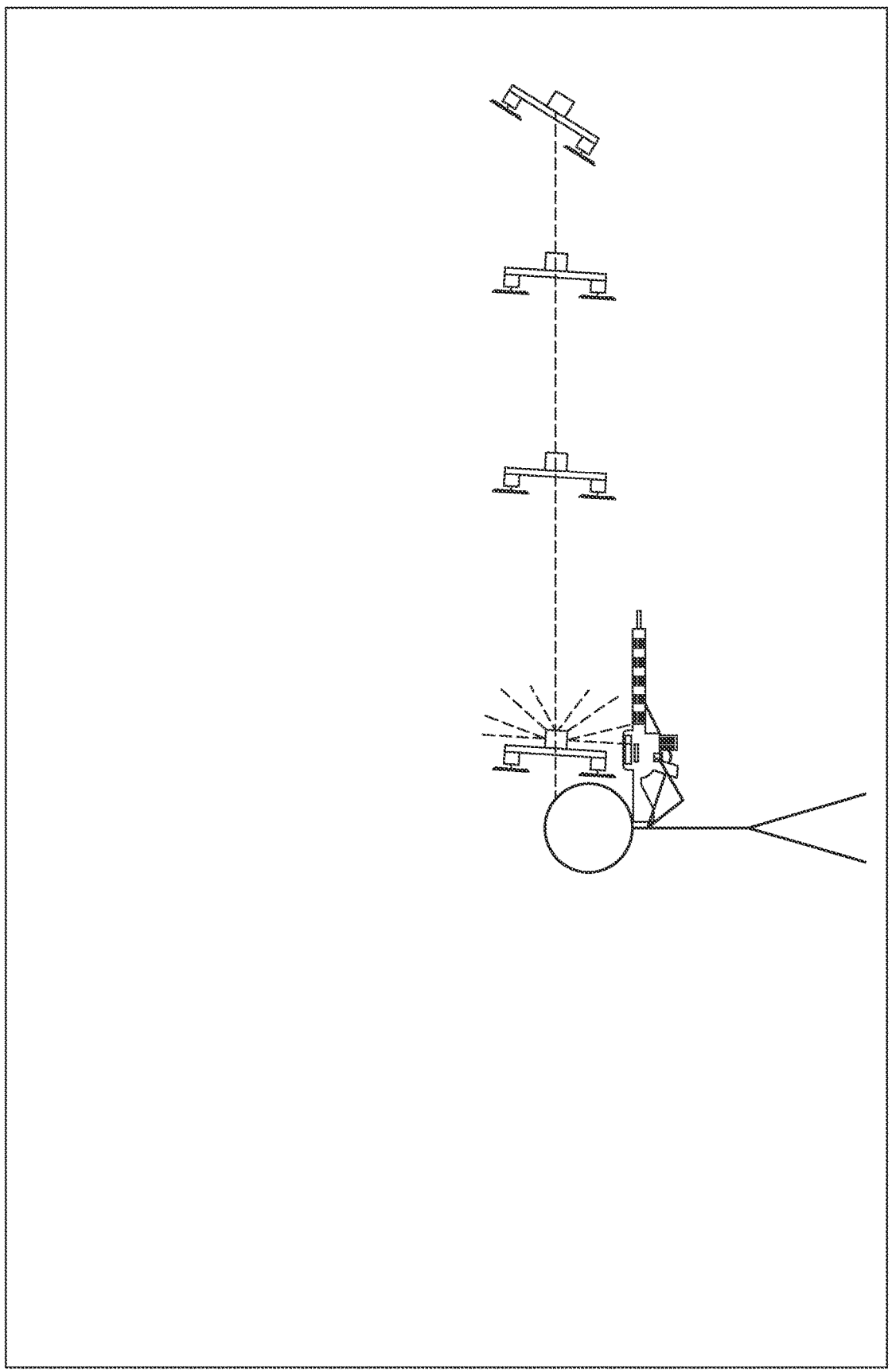
FIG. 22 illustrates a further tactic for drone use.

FIG. 22 illustrates a drone tactic for ramming the person being a threat. The drone may fly towards the shooter and attempt to impact the shooter in the upper body or face. In this mode, the drone proximity sensors that prevent the drone from hitting a structure may be turned off so that the drone can impact the active shooter. On impact, the pepper spray canisters may be detonated to further incapacitate the active shooter. This maneuver gets the canister and its contents closer to the shooters face at the time of detonation. This tactic is best used where the drone has limited space for maneuvering (the shooter is in a window/balcony of a building. Its also serves to stop the shooters gunfire either by distraction, physical contact or by delivery of the canisters' contents.

Figure 23:
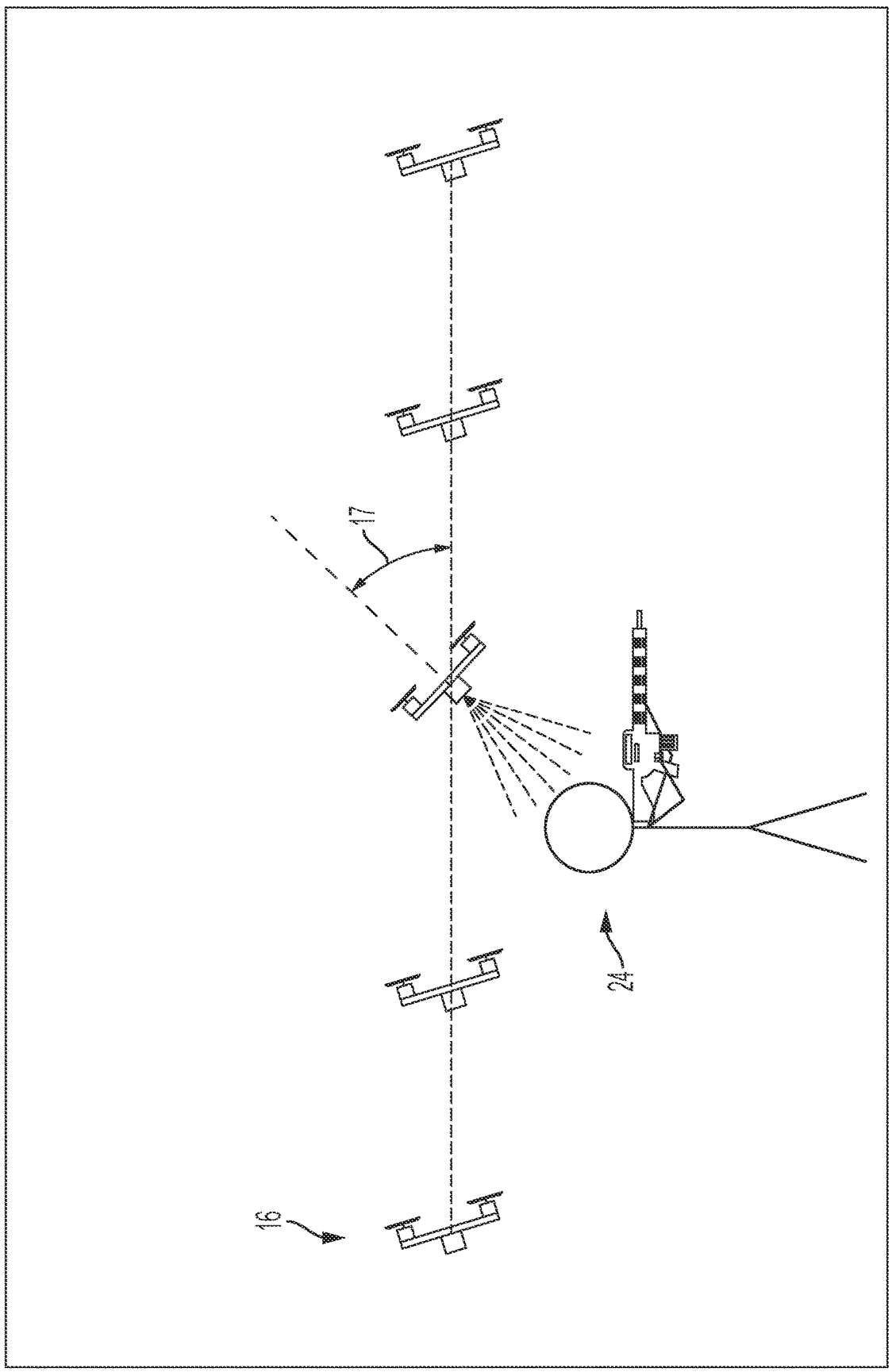
FIG. 23 illustrates a further tactic for drone use.

FIG. 23 illustrates a drone tactic for flyby next to the person being a threat. The drones flight path may be higher than an elevation of the active shooter's head. The drone 16 may pass from left to right over the shooter 24. In order to do so, the drone 16 is tilted forward. Based on the speed of the drone, the angle of the pepper spray canister might not be optimal to spray the pepper spray onto the active shooter. When the drone 16 is above the shooter 24, the drone 16 may slow down so that the angle of the pepper spray canister may be aligned at the optimal angle 17 toward the shooter 24 as shown by the middle drone in FIG. 23. As the drone passes the shooter, the on-board computer or the base station calculates the optimal detonation point based on the shooters' location in relation to the drones' flight path, speed and predicted trajectory of the canister contents. Once the canister has exploded and the pepper spray is directed toward the shooter 24, the drone 16 may then speed up to escape being damaged by the shooter physically by being shot at or hit with a rock, stone, hand or other object. The drones can also execute this maneuver side by side to maximize coverage area during one pass of the drones.

Figure 24:
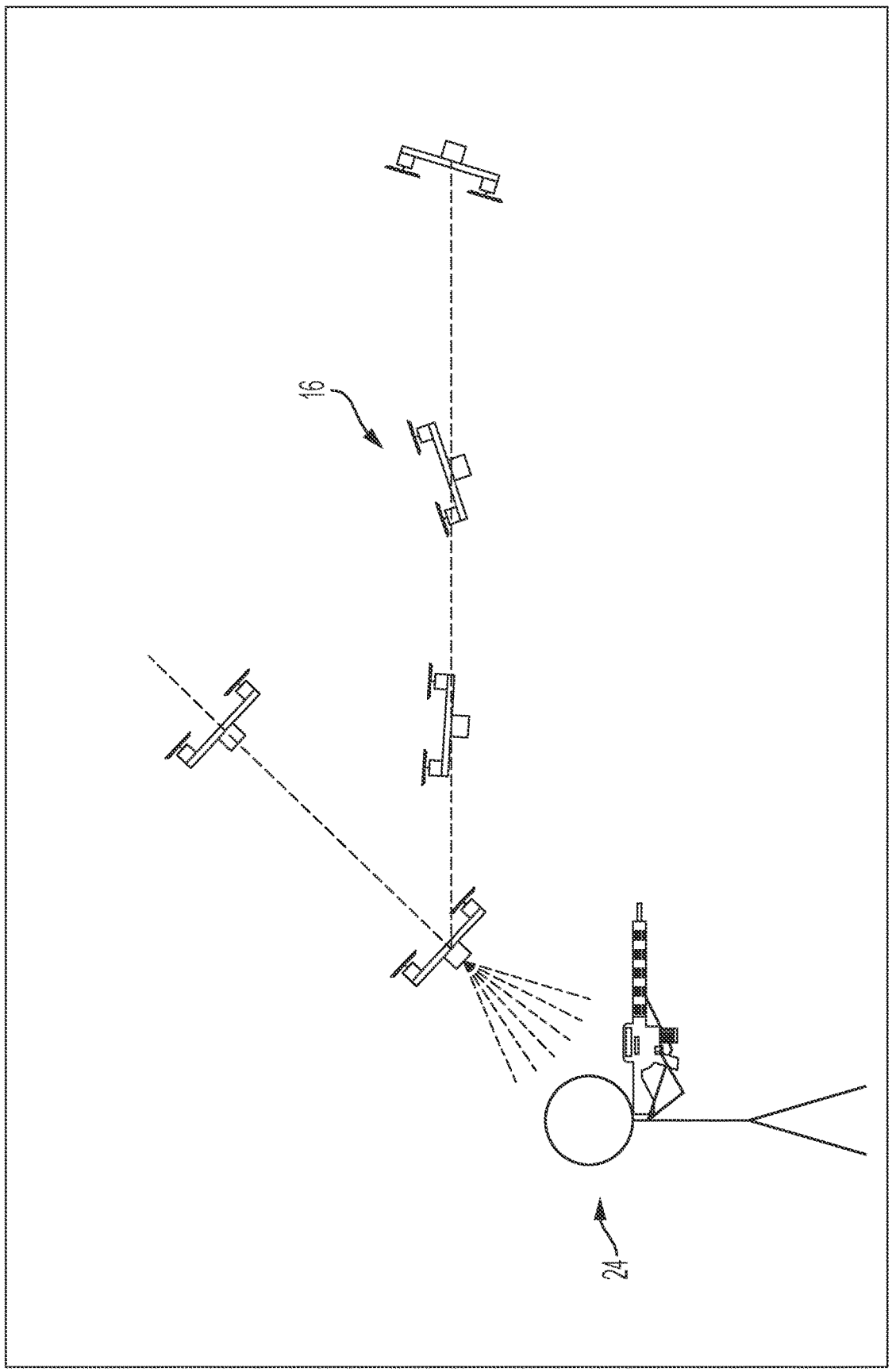
FIG. 24 illustrates a further tactic for drone use.

FIG. 24 illustrates a drone tactic for redirect. The drone may tilt forward to fly at the target. Once within range of the target, the front of the drone tilts upwards directing its canisters at the target. The drone triggers the canister, releasing its contents as the rotors disperse the contents toward the target. The drone 16 behaves in the same manner as described in relation to FIG. 20 except that the drone 16 flies in a straight line instead of an erratic line as shown in FIG. 20.

Figure 25:
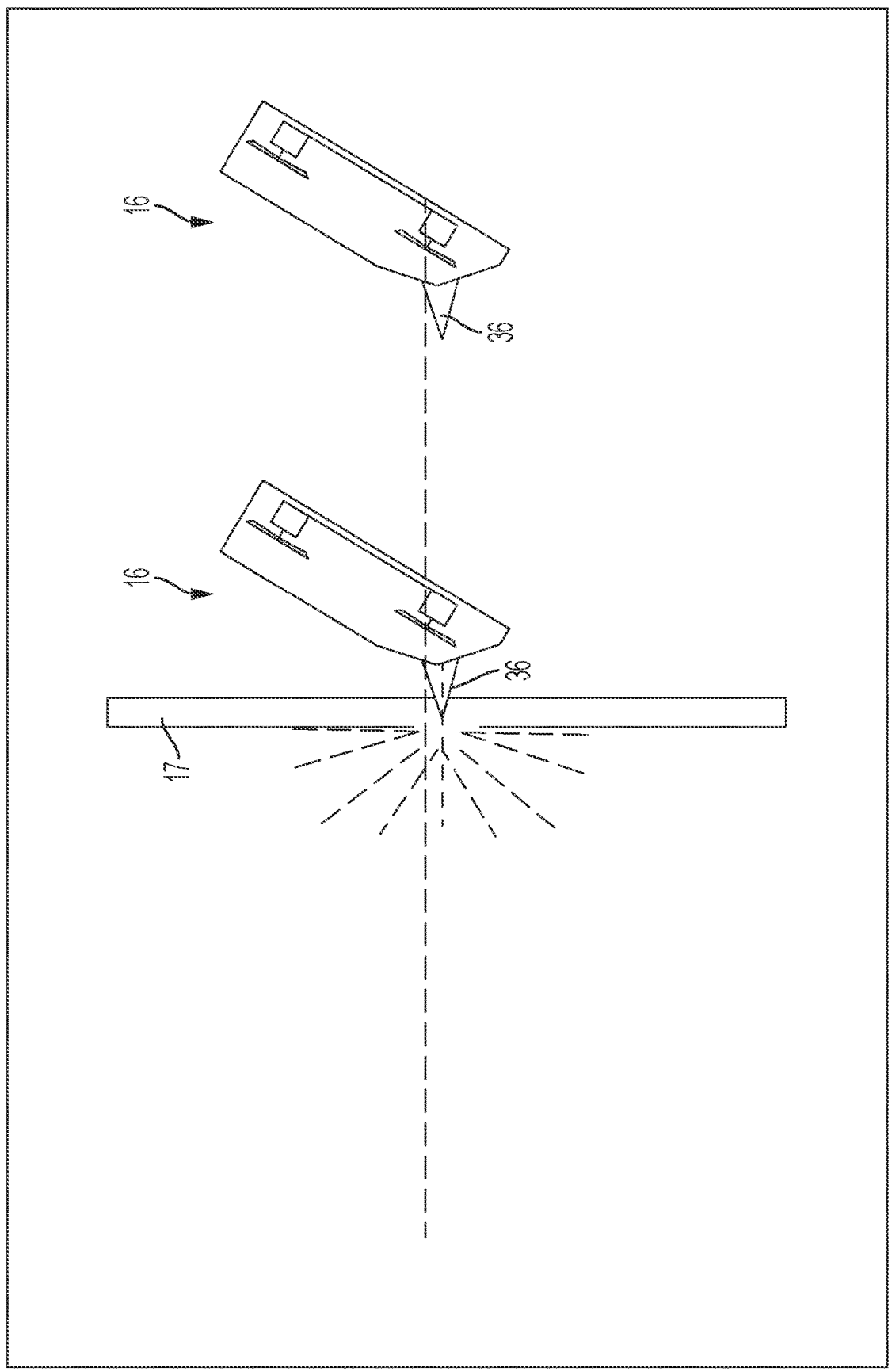
FIG. 25 illustrates a further tactic for drone use.

FIG. 25 illustrates a drone tactic for breaking glass 17. The reason that the drone is configured to break glass is that the shooter may be inside of a room having a window. To gain access to the room or space inside of the building, a plurality of drones may act together. A first drone may break the glass to create an access opening for the other drones, then the rest of the drones may enter the building, room or space inside the building via the access opening. To this end, the drones may be fitted with glass penetrators 36 (e.g., glass breakers) that protrude out from the body or near the blades of the drone, at an upward angle so that when the drones tilt forward for speed, the penetrator is parallel to the ground. The drones use this tactic to gain access to a building or vehicle. As discussed herein, the drone 16 may break the glass 17 with its glass breaker 36, the second drone 16 following behind the first drone 16 may enter through the window or opening made by the first drone.

Figure 26:
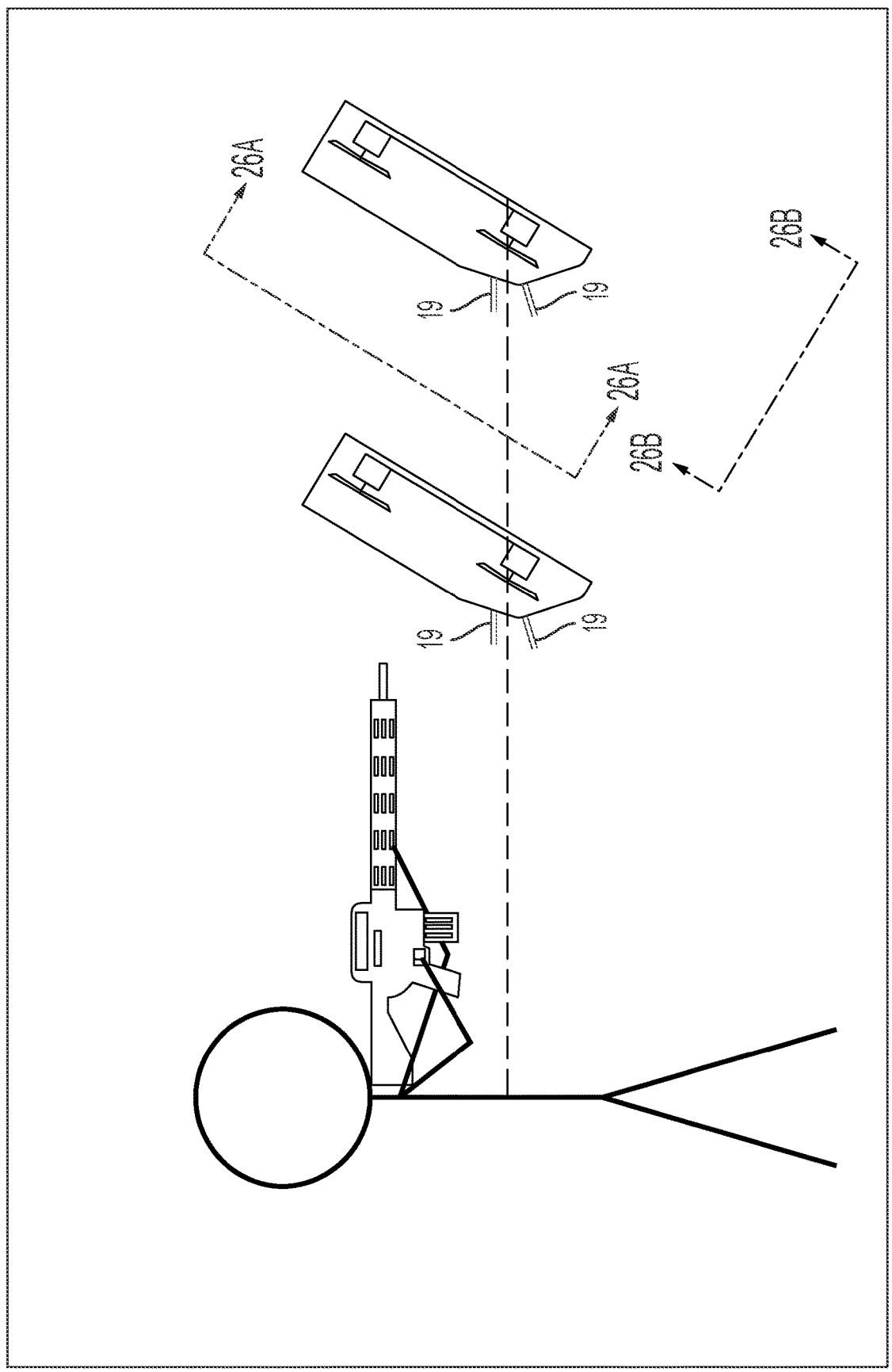
FIG. 26 illustrates a further tactic for drone use.

FIG. 26 illustrates a drone tactic for electroshock takedown. The drone may have electrodes 19 that protrude out from the drones' body, arms or rotor covers. The drone tilts forward to gain speed, maneuvers to line up the electrodes with the target and attempts to make contact with its electrodes and the target. The drones determine when to electrify the electrodes based on sensor information (camera, proximity sensor or inertial measurement).

Figure 26B:
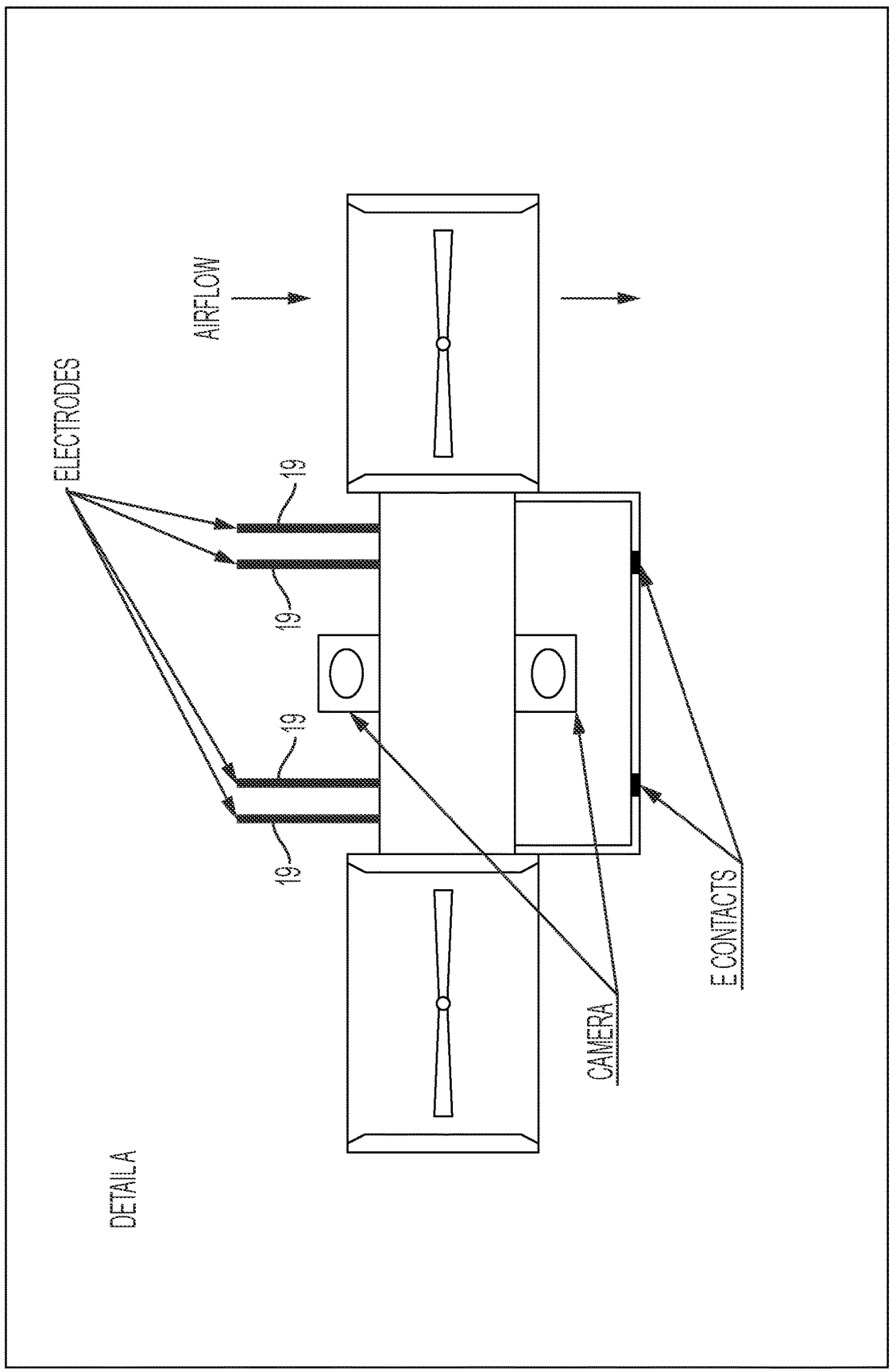
FIG. 26B illustrates another detail view of electrodes fitted on the drone.

Referring now to FIGS. 26A and 26B, these figures illustrate an embodiment of the drone having the capability to deliver an electrical shock to the active shooter. For example, this drone may incapacitate an active shooter (e.g., target) with an electrical shock (like a stun gun). The electrodes 19 may protrude out from the body of the drone or the arms or propeller guards. An onboard voltage amplifier circuit may use the drone's battery or dedicated battery to electrify the electrodes. The drone's computer determines when to electrify the electrodes with the use of sensors (camera, proximity sensors or IMU with impact). The drone can have electrical contacts for charging and or communications. This design eliminates the need for an electrode launching mechanism. Enabling a weight and size reduction of the drone. The electrical charge from the battery may be timed to disperse through the electrodes at the right time.

Figure 27:
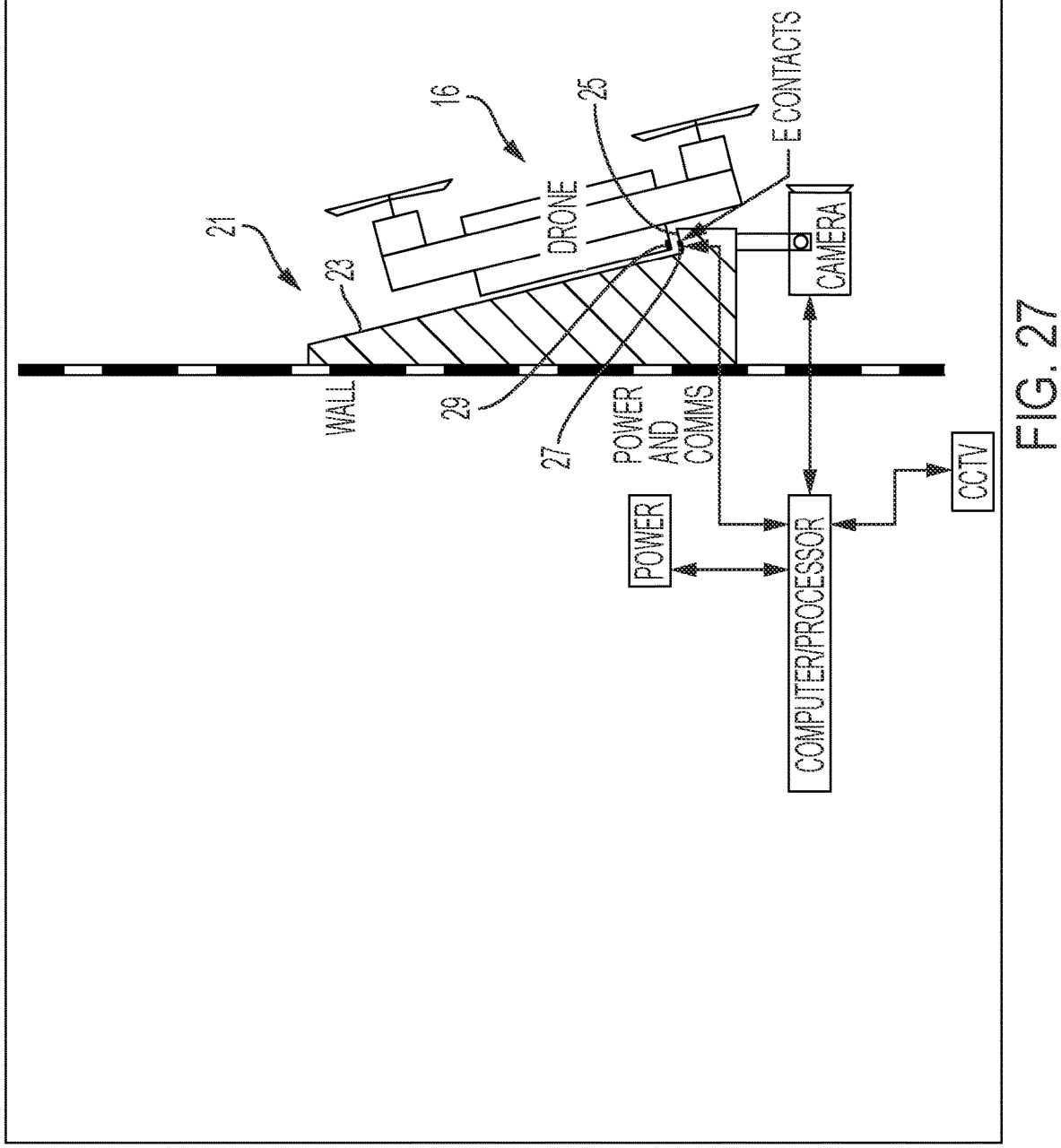
FIG. 27 illustrates a drone dock.

FIG. 27 illustrates a drone dock 21. The drone dock 21 may have an angled surface 23 that the drone 16 rests against and a shelf 25 at the bottom to hold the drone in place. The dock can have electrical contacts 27 for data transfer or charging. The drone 16 may also have electrical contacts 29 for charging its battery when the contacts 29 or in contact with 27 retransfers electricity to charge the battery of the drone 16. This occurs when the drone 16 is loaded on the drone dock 21 as shown in FIG. 27. The drone can fly off on its own power. The dock can have a camera that feeds into the drone or central computer (base station). The computer, dock camera and drone can be integrated into a CCTV system.

Figure 28:
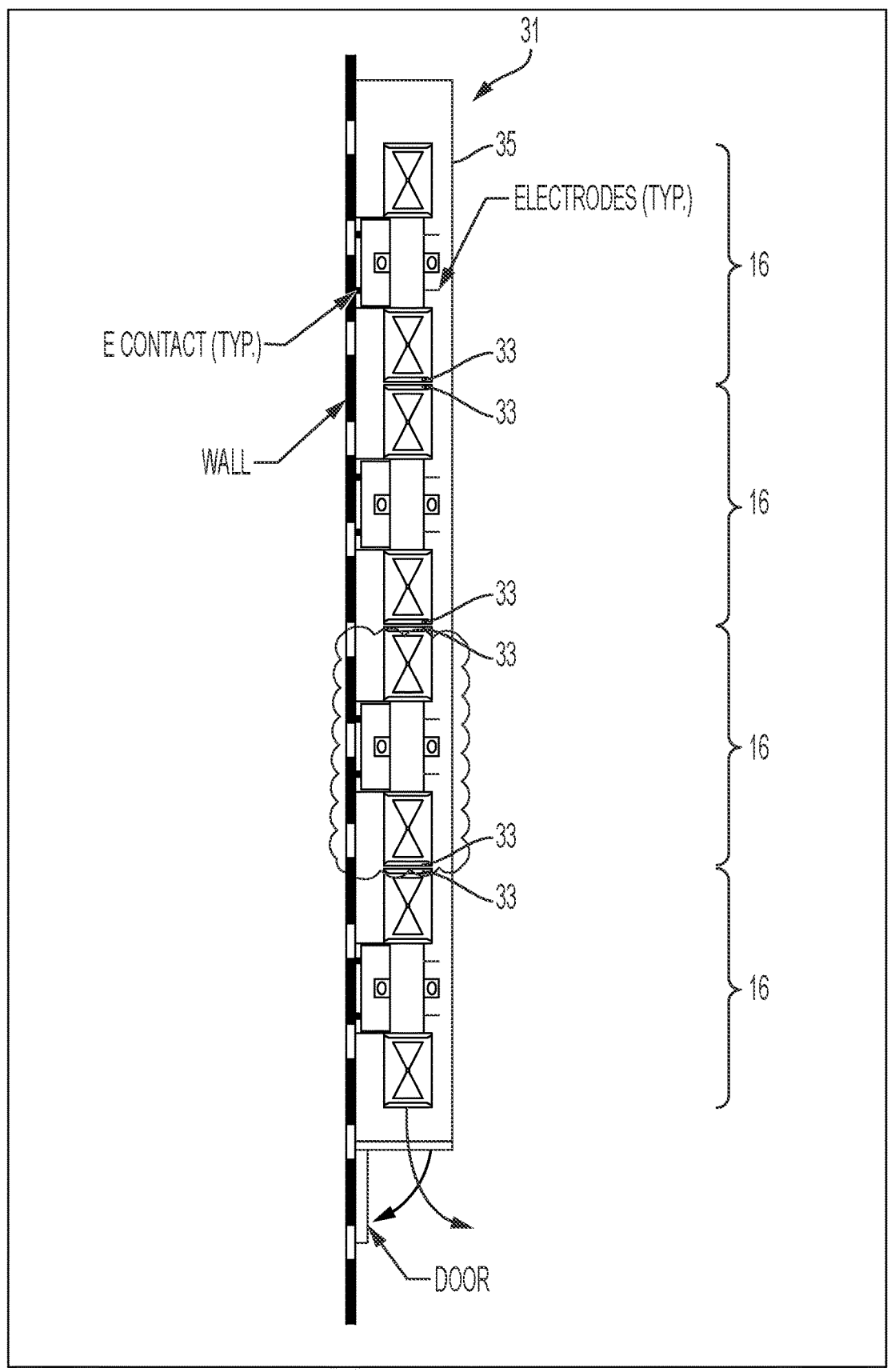
FIG. 28 illustrates a drone launcher.
Figure 29:
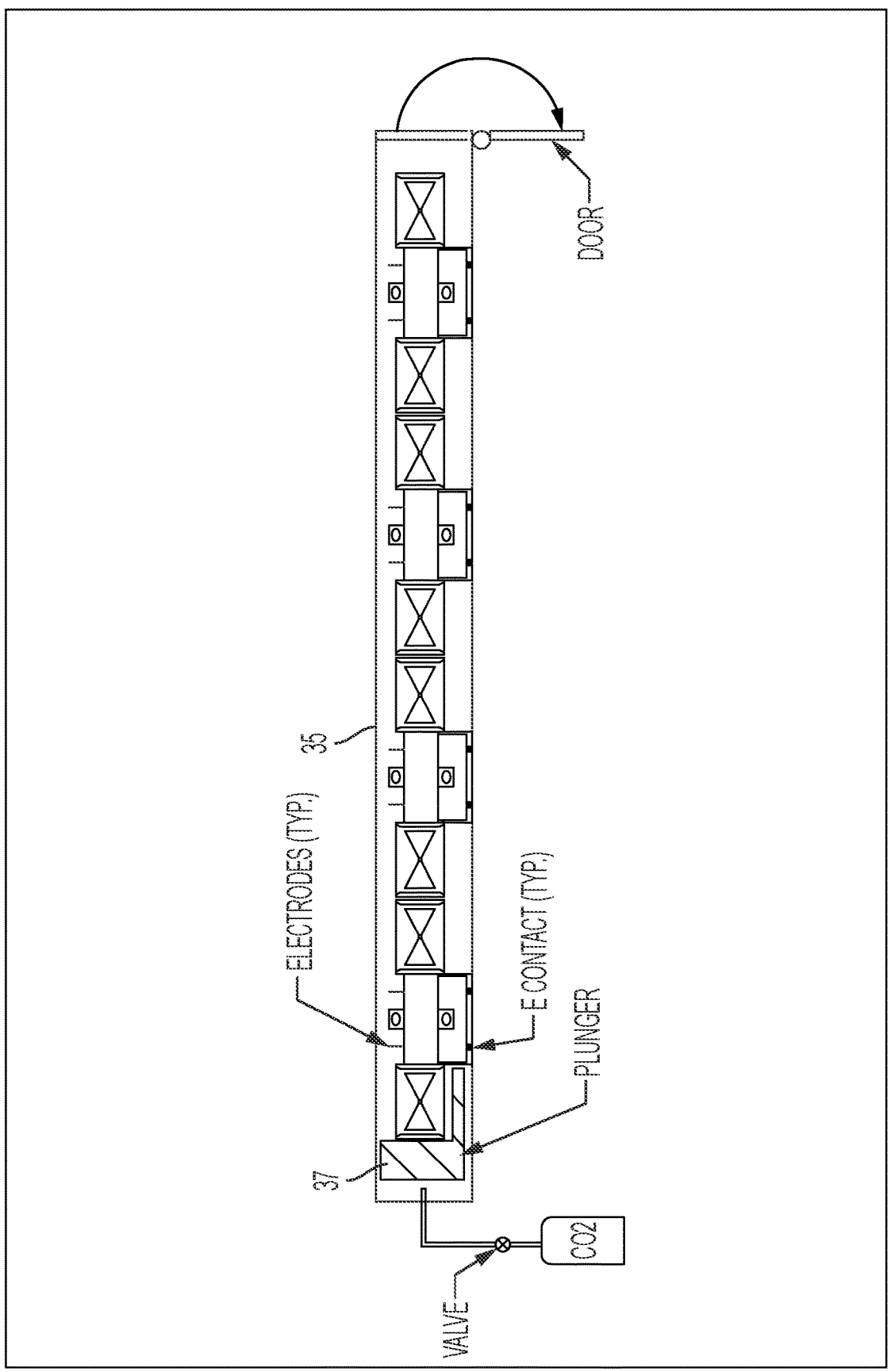
FIG. 29 illustrates another embodiment of the drone launcher.

Referring now to FIGS. 28 and 29, drone launcher 31 is shown. The drones may have propeller guards 33 that allow them to press up against each other. They are placed in a tube 35 that has an opening (or door) on one end and a plunger (or pusher) on the opposite end. A pressurized tank with valve may be connected to the tube (opposite the door). When activated, the compressed gas forces the plunger 37 and drones out of the tube.

The launcher can be angled upwards (i.e., vertical as shown in FIG. 28) to give the drones flight controller more time before colliding with the ground. The tube can have electrical contacts for communication/power connection to the drones so that the drones' batteries can be powered and charged and ready to fly when needed while the drones 16 are being stored away. A computer can control the door opening and pressure valve to remote launch the drones. This launcher enables the deployment of multiple drones through a smaller opening (police car window).

The description of a drone launcher gravity powered has been disclosed. Multiple drones may be stacked in a tube, with the bottom having a remote-controlled door. The tube/launcher can be placed in a high up location (building face, light post, column etc.) enabling the drones flight controller to maneuver before hitting the ground. The drones can be placed vertically (see FIG. 28) so that when in free fall, the trust from the propellers drives the drone away from the wall or structure. The tube can have charging and communication contacts for the drones. The launcher may have a camera mounted to feed the drones or drone control system.

For purposes herein, the lachrymatory agent may comprise pepper spray, 2-chlorobenzalmalononitrile ("CS gas"), Tungsten hexafluoride, Acetic anhydride, Thionyl chloride, Chloropicrin, Acrolein, Ethyl acrylate, and other compositions which effect lachrymation, causing the secretion of tears. The lachrymatory agent may comprise a liquid, a noxious gas or powder.

Also, the terms "bottle" and "can" or "canister" may be used interchangeably herein in accordance with the plain and ordinary meaning and usage by one having skill in the art.

UAVs are widely known and appreciated in the art, and therefore certain particulars including inner workings, fundamentals, materials, and assembly procedures are readily available for reference, and generally considered to be within the ordinary level of skill in the art. As such, for clarity and simplicity, a detailed reference to some of these things will not be expressly made in this disclosure. Rather, it is the intent that any details omitted herein should be resolved from the ordinary knowledge and skill in the art of UAVs. However, certain novel features, combinations and arrangements are explicitly disclosed and claimed herein in order to set forth the spirit and scope of the invention, and to enable the same.

Figure 30:
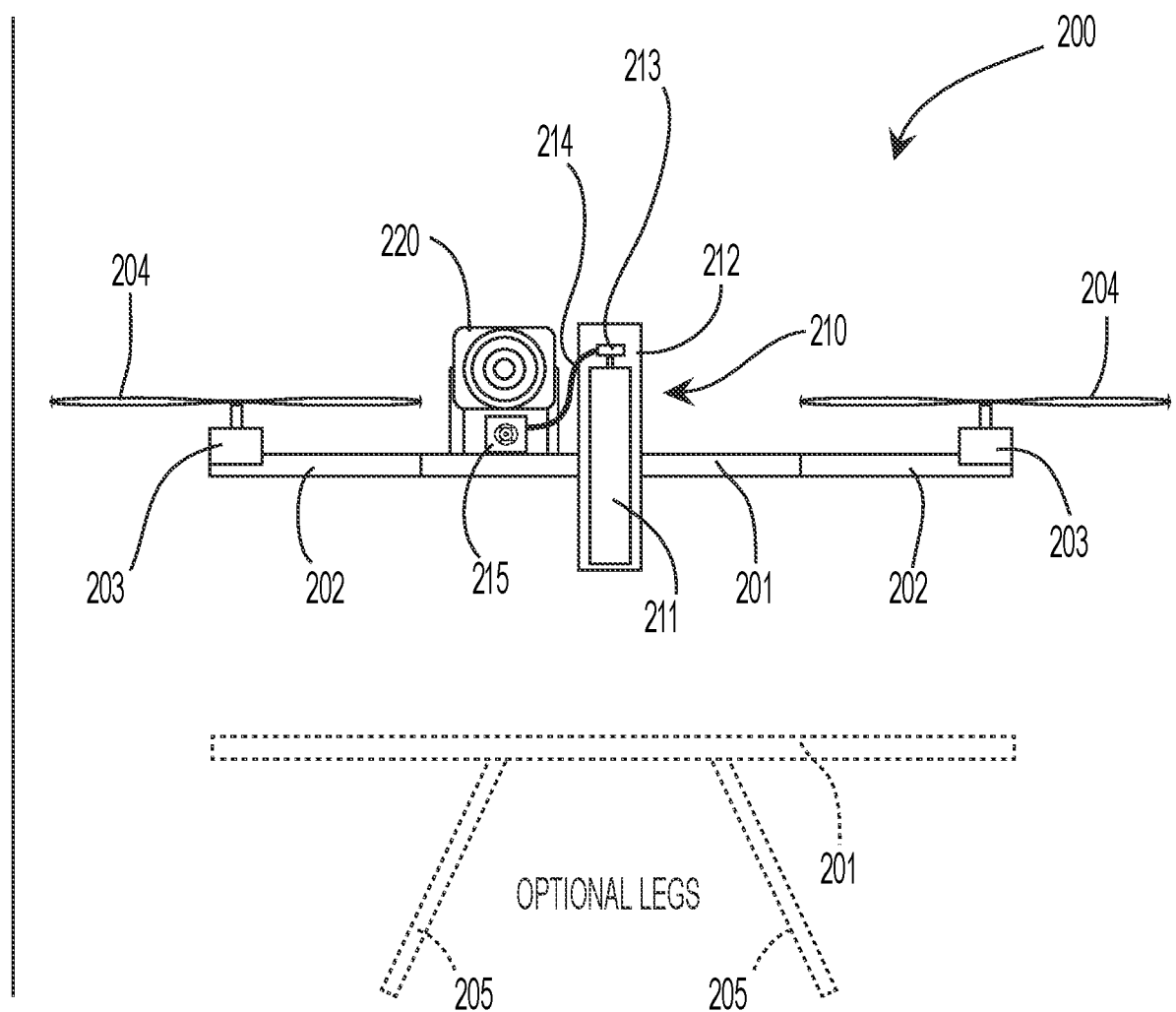
FIG. 30 shows a front elevation view of an unmanned aerial vehicle (UAV) configured to deploy a lachrymatory agent in accordance with an illustrated embodiment.

Now, turning to the drawings, FIG. 30 shows a front elevation view of an unmanned aerial vehicle (UAV) 200 configured to deploy a lachrymatory agent in accordance with an illustrated embodiment. The UAV comprises a body 201 having a plurality of arms 202 extending from a proximal end at the body of the UAV to a distal end. Each arm is coupled to an aviation-suitable electric motor 203 disposed at the distal end of the respective arm. Aviation-suitable electric motors are those which are generally lightweight compared to conventional electric motors. However, any electric motor may be similarly incorporated. Coupled to each electric motor is a propeller 204 having one or more blades each extending radially outwardly from the motor and configured to produce lift. The UAV may optionally, and preferably, comprise legs 205 for landing purposes, shown in broken lines as being optional.

The UAV is further characterized in that it comprises a lachrymatory agent-deploying assembly, a nozzle, and a first-person view (FPV) camera.

The lachrymatory agent-deploying assembly 210, in the embodiment illustrated in FIG. 30, generally comprises a lachrymatory agent containing bottle 211 disposed or nested within a portion of the can stabilizer 212. A servo-actuator 213 is deployed upon receiving a wireless signal such that the contents of the bottle are release through a hose 214 and into the nozzle 215, where a spray pattern 226 is communicated from the nozzle. Generally, the servo-actuator is configured to translate in a vertical direction, depressing a release valve of the bottle. In some embodiments, the bottle comprises an aerosol canister configured to release the lachrymatory agent.

Additionally, the UAV is equipped with a first-person view (FPV) camera 220. The camera is oriented or otherwise configured in alignment with the nozzle, such that a video output from the FPV camera can be combined with a target-acquisition overlay to allow a remote operator of the UAV to visualize an enemy target and deploy the lachrymatory agent in a spray pattern extending outwardly from the UAV to the target.

The arms of the UAV may be designed for collapsible nesting about the body portion. In this regard, the UAV may be configured for portability.

In certain embodiments, the can stabilizer is configured to hold the can at a height which is vertically centered about the body of the UAV. This provides a centered mass that increases flight maneuverability.

In other embodiments, as further illustrated herein, multiple lachrymatory agent containing bottles may be mounted on the UAV.

The UAV may be remotely controlled, via wireless communication. Alternatively, the UAV may be configured with software for self-piloting (e.g., no human intervention) or be controlled by a base station or an operator at the base station.

In one aspect, a facility is provided with audio sensors, visual sensors, or a combination thereof. The sensors are used to detect gunshots or other events, which events would trigger the launch and use of the UAV as described herein. For example, the sensors can be used in an overall system to detect a location of the gunshots or events, and direct the UAV to the location. The UAV may be configured to receive a continuous feed of data related to events and locations of detected events. One or more thermal energy sensors, or infrared sensors, can be implemented to detect location of an enemy target. Onboard video systems enable use of a video camera to confirm the identify and location of the target. Once in range of the target, the UAV can be configured to deploy the lachrymatory agent, laterally outward from the UAV, such that the target is engaged with non-lethal force.

The drone may be stored in an enclosure to keep it housed from the outdoor environment, and may implement a battery charger to keep the UAV at full power and ready to deploy. Examples of these are shown in FIGS. 27-29. The enclosure can be armored to prevent gunmen from targeting the drone first. Also, it can have an electronically-translated (opened) access so that it can be opened by the drone or ground system.

Figure 31:
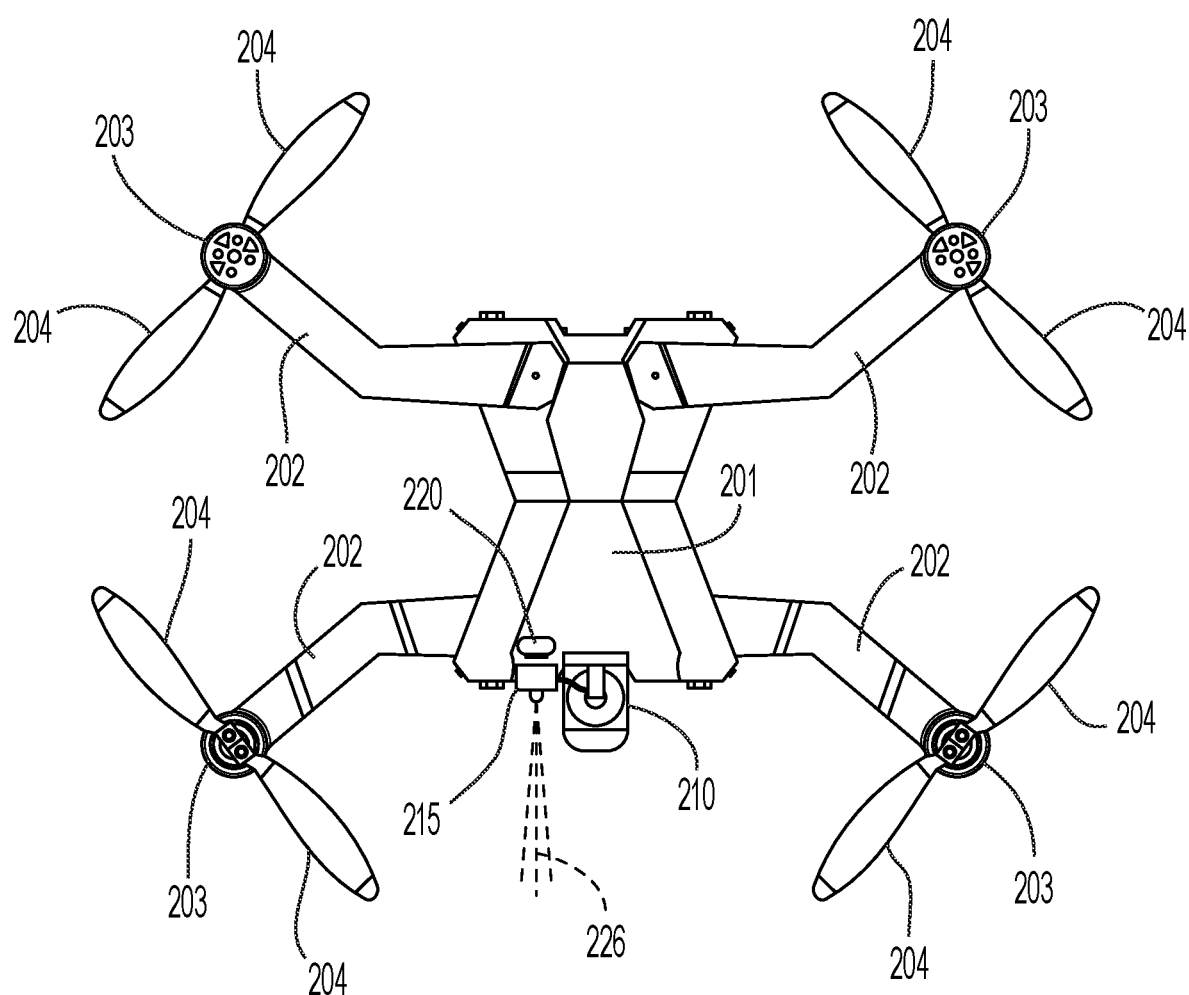
FIG. 31 shows a top plan view of the UAV in accordance with the illustrated embodiment.

FIG. 31 shows a top plan view of the UAV in accordance with the illustrated embodiment. As above, the UAV comprises a body 201, and multiple arms 202 extending outwardly from the body (here four arms). At a distal end of each arm an electric motor 203 is disposed. The electric motor is further coupled to one or more propellers 204 having one or more blades extending radially outwardly from the motor.

The UAV is further characterized as comprising a lachrymatory agent-deploying assembly 210 configured to deploy a lachrymatory agent to nozzle 215, where spray pattern 226 is deployed. The UAV further includes an FPV camera 220 configured in video-alignment with the nozzle.

It should be noted that in some embodiments the nozzle, FPV camera, or a combination thereof, may be equipped with a tilt (pitch) or yaw adjusting mechanism, such as, for example, an accelerometer and rotational movement device, or any system known in the art for rotating componentry about a fixed base.

Figure 32:
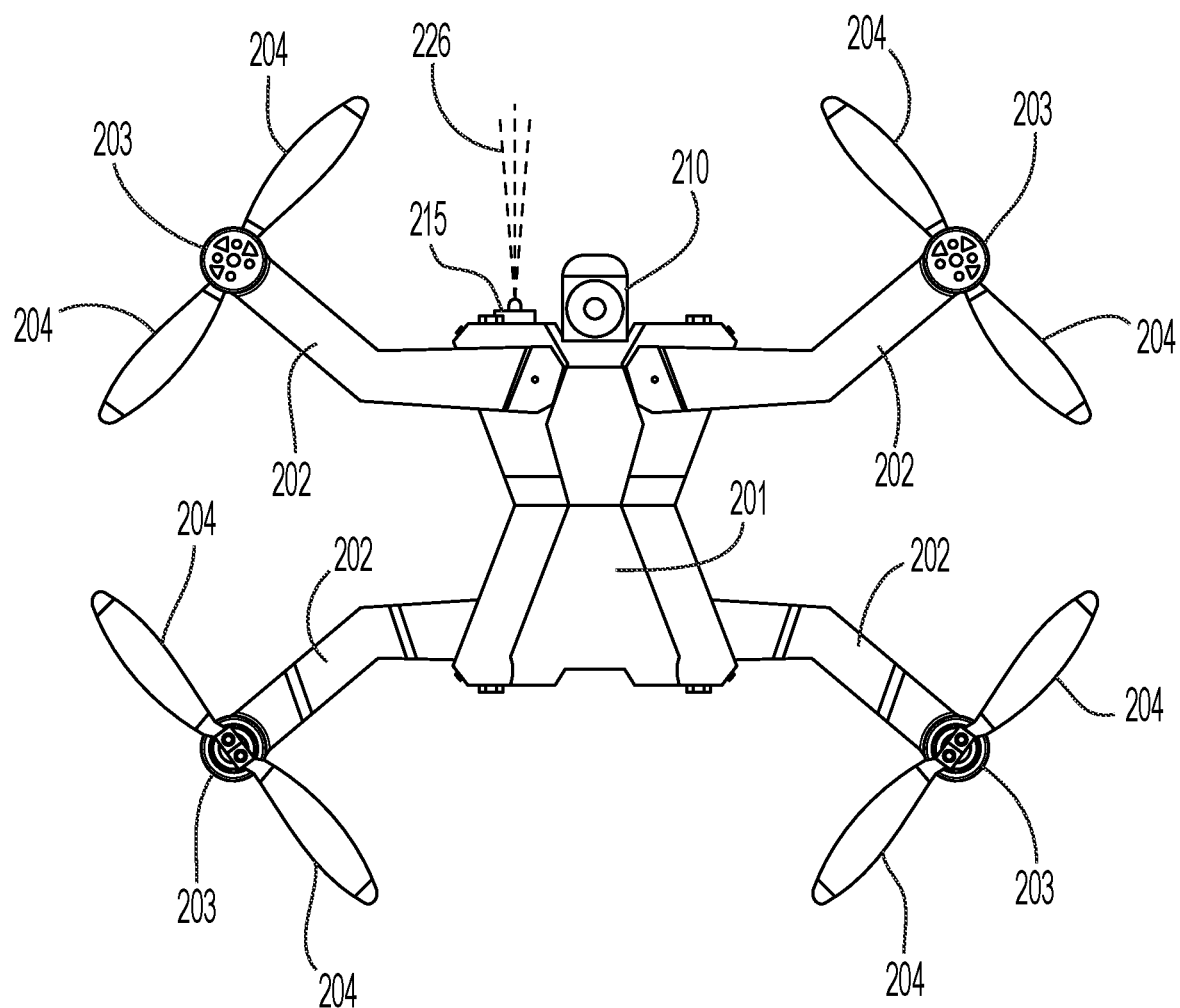
FIG. 32 shows a bottom plan view of the UAV in accordance with the illustrated embodiment.

FIG. 32 shows a bottom plan view of the UAV in accordance with the illustrated embodiment. The UAV is shown comprising a body 201, and multiple arms 202 extending outwardly from the body (here four arms). At a distal end of each arm an electric motor 203 is disposed. The electric motor is further coupled to one or more propellers 204 having one or more blades extending radially outwardly from the motor. The UAV is further characterized as comprising a lachrymatory agent-deploying assembly 210 configured to deploy a lachrymatory agent to nozzle 215, where spray pattern 226 is deployed. The UAV further includes an FPV camera 220 configured in video-alignment with the nozzle.

Figure 33:
FIG. 33 is a video representation of a screen with target-acquisition overlay as implemented with a video output of the UAV in accordance with the illustrated embodiment.

FIG. 33 is a video representation of a display 300 with target-acquisition overlay 350 as implemented with a video output of the UAV in accordance with the illustrated embodiment. The target-acquisition overlay is configured through alignment of the camera, nozzle, and optionally pressure adjustments of the fluid or gas as communicated from the nozzle, such that the agent is deployed in a direction of the intended target using the target acquisition overlay ("crosshairs").

Figure 34:
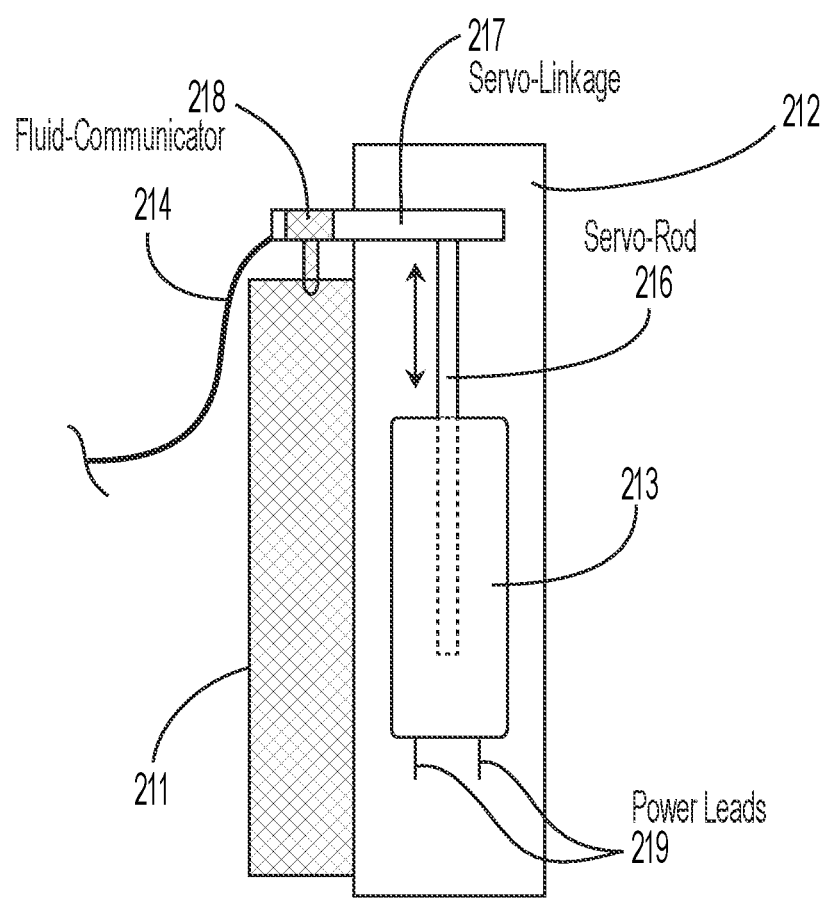
FIG. 34 shows an elevation view of a deployment assembly for implementation with the UAV in accordance with the illustrated embodiment.

FIG. 34 shows an elevation view of a deployment assembly for implementation with the UAV in accordance with the illustrated embodiment. As detailed in FIG. 34, the lachrymatory agent-deploying assembly 210 (or "deployment assembly") generally comprises a lachrymatory agent-containing bottle 211 disposed or nested within a portion of the can stabilizer 212. A servo-actuator 213 is provided, wherein the servo-actuator is configured to be translated upon receiving a wireless signal from the system, such that the contents of the bottle are release through a hose 214 and into the nozzle, wherein a spray pattern is communicated from the nozzle. Upon receiving the wireless signal, control voltage can be supplied to power leads 219 for translating the servo-actuator. The servo-actuator includes a servo-rod 216 coupled to a servo linkage 217, wherein the servo linkage extends outwardly to engage a fluid communicator 218 of the lachrymatory agent-containing bottle. As the servo-actuator translates, the servo-linkage moves with it applying directional pressure to the fluid communicator, which in turn releases the lachrymatory agent from the bottle and into the hose where it is further communicated to the nozzle. Generally, the servo-actuator is configured to translate in a vertical direction, depressing a release valve (fluid communicator) of the bottle, though other embodiments are contemplated herein.

While the bottle is shown oriented in an upright-position in the embodiment of FIG. 34, it is contemplated that the bottle may be alternatively oriented and configured in an upside-down position, wherein the bottle itself is configured to dispense the lachrymatory agent in the upside-down position.

Figure 35:
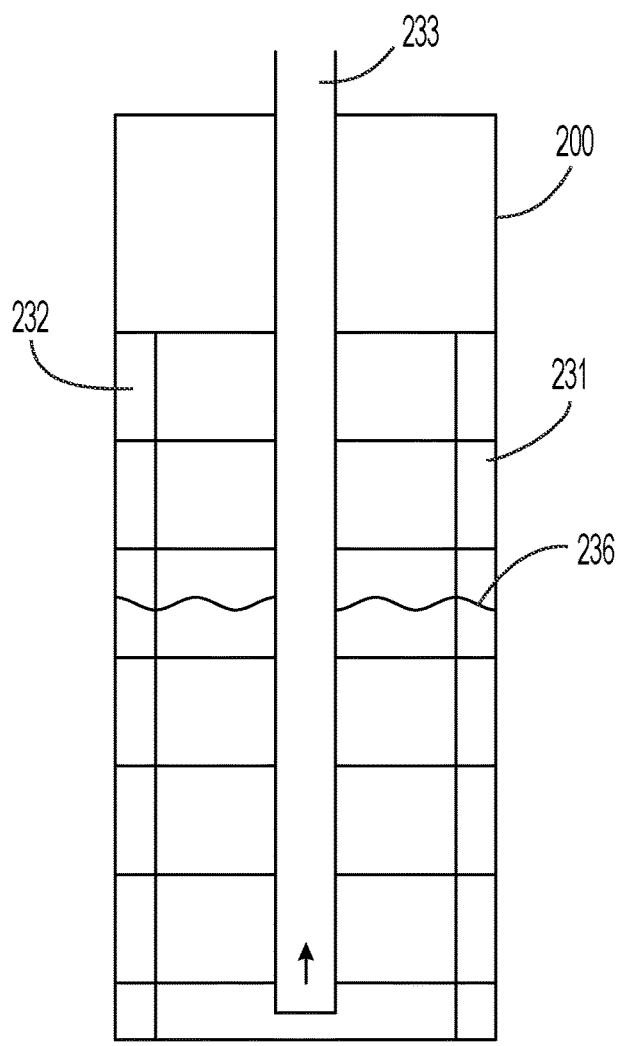
FIG. 35 shows a section view of a lachrymatory agent-containing bottle in accordance with an embodiment.

FIG. 35 shows a section view of a lachrymatory agent-containing bottle in accordance with an embodiment. In this embodiment, the bottle is shown with a plurality of baffles 231 extending vertically within an inner volume of the bottle, each separated by spacers 232. The plurality of baffles and spacers define layers within the bottle. A fluid conduit 233 is shown extending upwardly, wherein liquid 236 within the bottle is communicated through the fluid conduit to the fluid communicator. In this regard, as the UAV travels in the air, lachrymatory agent is contained within the baffle-containing bottle as shown, such that sufficient agent is available for deployment even during and after rigorous flight activity, for example, evasive maneuvers or aggressive flight.

Figure 6:
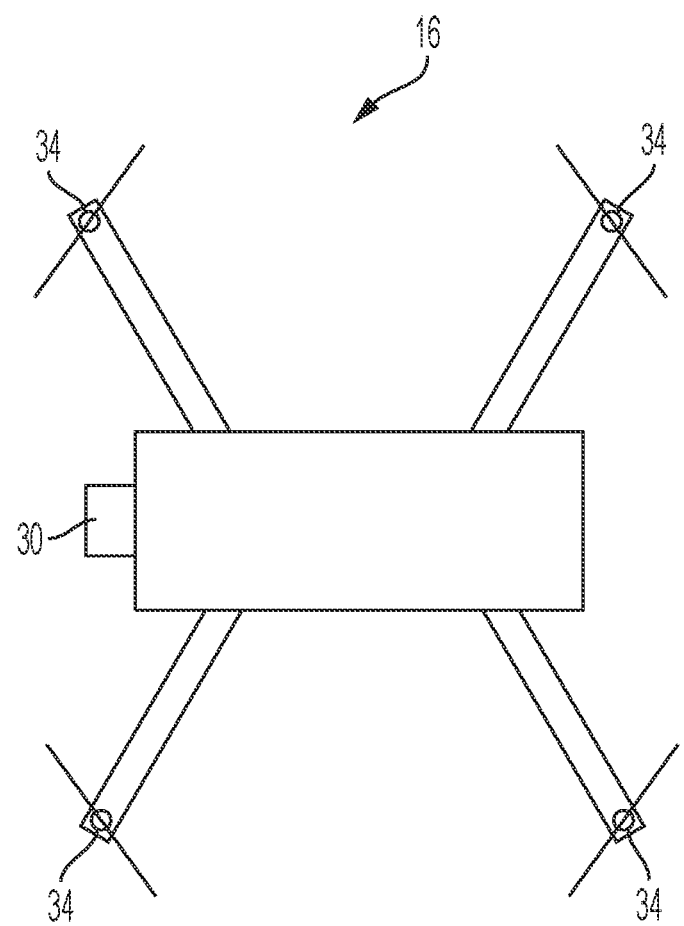
FIG. 6 illustrates the top view of the drone.
Figure 36:
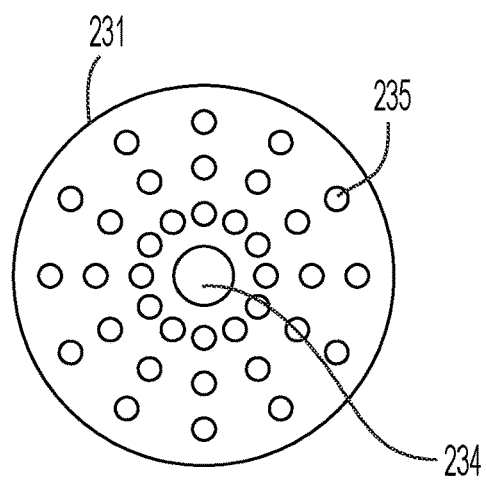
FIG. 36 shows a top plan view of a baffle for integration with the lachrymatory agent-containing bottle of FIG. 6.

FIG. 36 shows a top plan view of a baffle 231 for integration with the lachrymatory agent-containing bottle of FIG. 6. The baffle disc has a center aperture 234, and a plurality of baffle apertures 235 each disposed radially between the center aperture and a periphery of the baffle.

Figure 37:
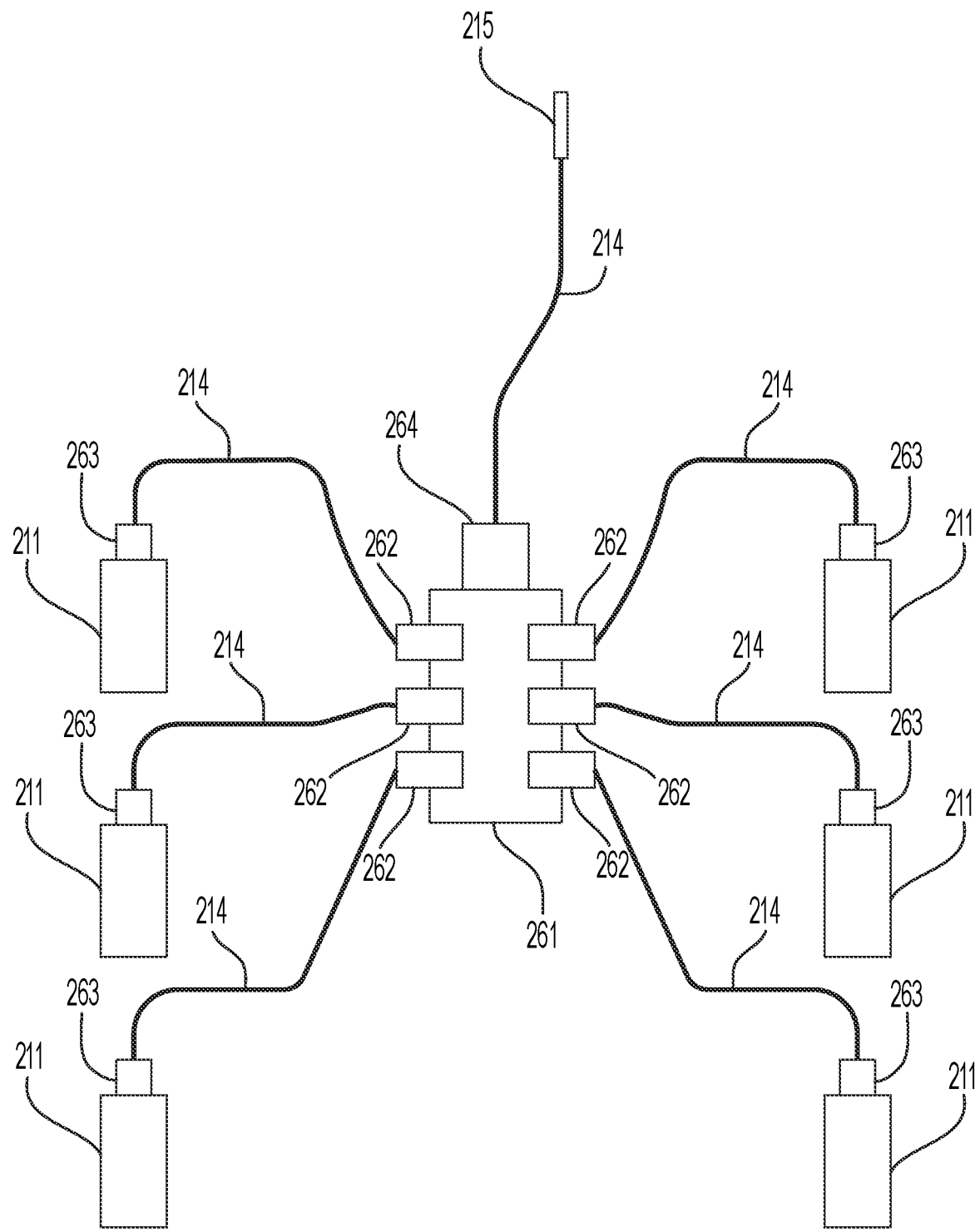
FIG. 37 shows a schematic of a deployment assembly for implementation with the UAV in accordance with an alternative embodiment.

FIG. 37 shows a schematic of a deployment assembly 210 for implementation with the UAV in accordance with an alternative embodiment. Here, a plurality of canisters (or bottles) may be combined with a manifold assembly to provide evenly distributed lachrymatory agent about multiple sides or portions of the UAV. Here, the manifold assembly includes a multi-port manifold body 261, with a plurality of check valves 262, each check valve being disposed at one of the respective ports of the manifold. Each check valve is further coupled to a hose 214, and an optional adapter 263. The hose or optional adapter is coupled to a respective canister 211. In this regard, fluid or gas from the canister is communicated through the adapter and hose, to the check valve and respective port of the manifold. From there, a deployment valve 264 is configured to deploy the fluid or gas through a hose to the nozzle 215.

While the embodiment as illustrated in FIG. 37 shows six canisters, the manifold may comprise between two and twenty canisters, more preferably between two and six canisters are each positioned symmetrically around the body of the UAV.

Figure 38:
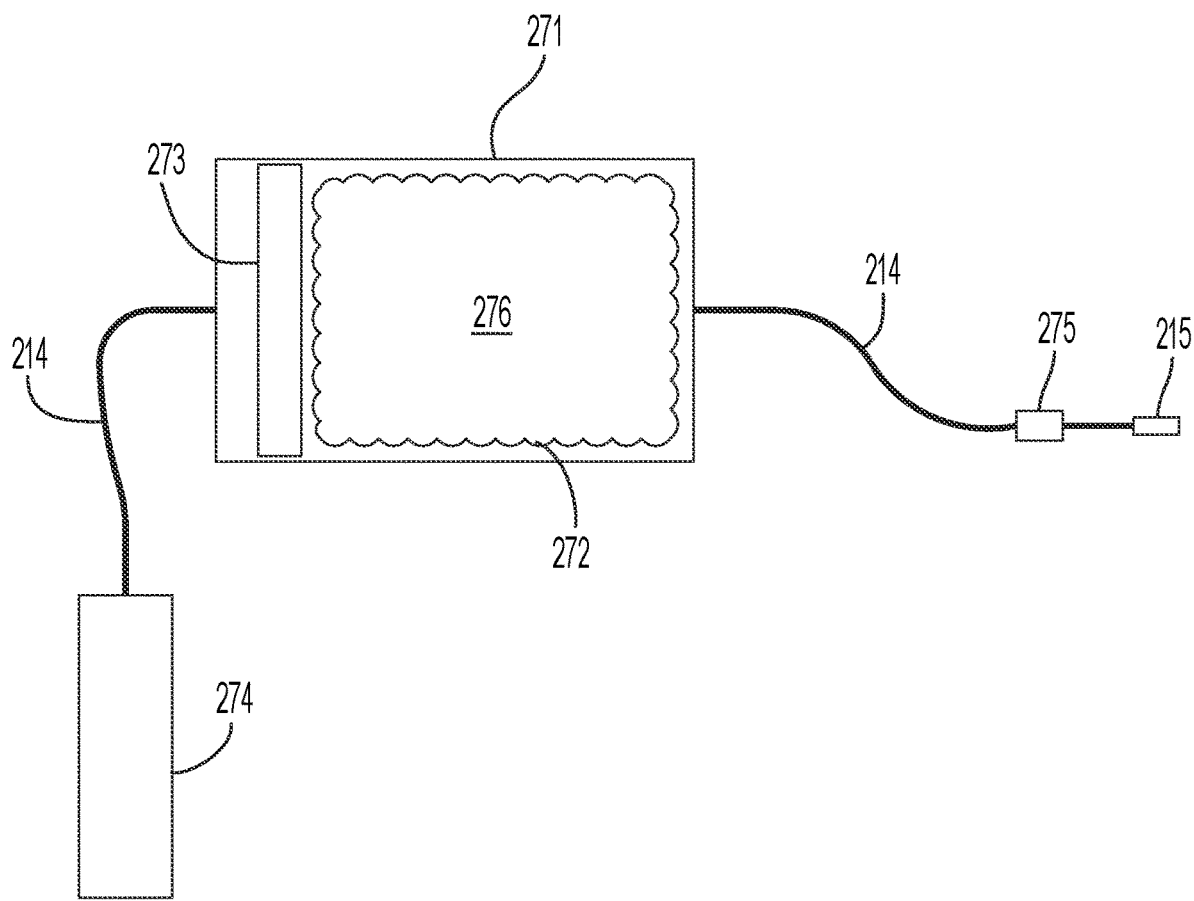
FIG. 38 shows a schematic of a deployment assembly for implementation with the UAV in accordance with yet another embodiment.

FIG. 38 shows a schematic of a deployment assembly 210 for implementation with the UAV in accordance with yet another embodiment. Here, a housing 271 is provided, with optional bag 272 for containing noxious gas 276. The gas is hermetically sealed within the housing using conventional seals, such as O-rings. A piston 273 is used to compress the noxious gas 276 within the housing at all times. As shown, the piston is maintained with a bias force due to compressed gas or fluid received from source 274, through a first hose 214a, to the piston 273. Alternatively, the piston can be directly driven by servo-motor (not shown). The fluid or gas for providing bias force at the piston may comprise carbon dioxide ($CO_2$) gas. Additionally, the compressed noxious gas 276 is further expelled from the housing, communicated through a second hose 214b to a servo-actuated valve 275. The servo-actuated valve, the piston, or a combination thereof, may be controlled by wireless signal received form the operator of the UAV. When actuated, the servo-actuated valve controls a flow of the compressed noxious gas through nozzle 215 to achieve deployment.

The various aspects and embodiments of the active shooter response system have been described in the context of a mass shooter in a school setting. However, the active shooter response system may be employed also in other settings such as work settings, law enforcement settings, special events, city streets and any other setting where a person might attack another person. Moreover, the various aspects and embodiments of the active shooter response system is not limited to a firearm setting. However, the system may be employed in relation to knife attacks, first fights, any attacks with or without a weapon.

The term drone may refer to a fixed wing airplane drone, a quad copter, a multiple propeller copter and any type of unmanned aerial vehicle.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for neutralizing an active shooter, the system comprising:

first and second flying drones, each of the first and second flying drones having a wireless transmitter and a sensor for sensing a status of the active shooter;

a base station operable by a human operator, the base station having a wireless transmitter, the wireless transmitter of the base station in wireless communication with the wireless transmitters of the first and second flying drones for transmitting data between the first flying drone, second flying drone, the base station or a combination thereof, and the human operator controls the first flying drone and the second flying drone reacts follows the first flying drone;

a plurality of stationary ground sensors in communication with the wireless transmitters of the first and second flying drones for communicating data from the stationary ground sensors to the base station or in communication with the base station for communicating data to the wireless transmitters of the first and second flying drones; and an offensive mechanism attached to each of the first and second flying drones, the offensive mechanism activatable to neutralize the active shooter;

wherein the status of the active shooter sensed by the sensor of the first flying drone activates the offensive mechanism of the second flying drone against the active shooter.

2. The system of claim 1 wherein the offensive mechanism is a pepper spray mechanism which is operative to disperse pepper spray at the active shooter, shock electrodes, propeller blades, a hardened body, a glass breaker or a combination thereof.

3. The system of claim 1 wherein the first and second flying drones are operative to transmit information and commands between flying drones to coordinate an attack of the first and second flying drones against the active shooter.

4. The system of claim 1 wherein the stationary ground sensors are sound sensors, and sound data from the sound sensors are transmitted to the base station to locate the active shooter.

5. The system of claim 1 wherein the base station determines a location of the active shooter based on a gun shot sound map and sensed sound of a gun shot from the stationary ground sensors.

6. The system of claim 1 wherein the base station or each of the drones may have a three-dimensional topographical map of an area of surveillance of the system, the three-dimensional topographical map determines flight paths of the drones, and the drones are only allowed to fly along the flight paths based on the topographical map.

7. A method of neutralizing a person, the method comprising the steps of:
traversing first and second drones in close proximity to the person to be neutralized;
pointing a sensor of the first drone toward the person to be neutralized;
sensing an activity of the person with the sensor on the first drone;
transmitting data from the sensor of the first drone from the first drone to a base station or the second drone;
activating an offensive mechanism of the second drone against the person based on data from the first drone.

8. The method of claim 7 further comprising the steps of:
traversing the first and second drones in close proximity to an exterior of a window while the person to be neutralized is located behind the window;
transmitting a first instruction from a base station to the first drone so that a glass breaking tip mounted at an angle to an upper side of the first drone is positioned to break a glass of the window when the first drone is rammed into the glass to break the glass and create an opening for the second drone to fly through the broken window;
traversing the first drone to crash into the window with the glass breaking tip positioned to break the glass of the window upon impact against the glass;
transmitting a second instruction from the base station to the second drone to fly through the opening created by the first drone; and
transmitting a third instruction from the base station to the second drone to activate the offensive mechanism of the second drone against the person to be neutralized to neutralize the person.

9. The method of claim 7 further comprising the step of transmitting instructions to the second drone to fly directly toward the person to be neutralized then to fly upward and away from the person to be neutralized so that a flight path when the second drone flies upward and away is aligned to the person to be neutralize, and to release a deterring agent attached to a bottom side of the second drone when the flight path is aligned to the person to be neutralized.

10. The method of claim 7 further comprising the steps of flying the second drone at an elevation at or below 4 feet so that a camera of the second drone with a field of view of the camera pointed upwards has the person to be neutralized within the field of view of the camera of the second drone.

11. The method of claim 7 further comprising the step of traversing a third drone toward the person to be neutralized and flying the third drone above the person to be neutralized so that the third drone hovers over the person.

12. The method of claim 7 further comprising the steps of:
detecting a feature of an area with cameras of the first and second drones;
recognizing the feature of the area within a topographical map stored in a computer; and
defining a location of the first and second drones upon matching the recognized feature from the cameras and the stored feature in the computer.

13. The method of claim 12 further comprising the steps of:
transmitting data regarding the feature to the base station;
performing the recognizing step at the base station; and
transmitting location data based on the transmitting data step and the performing step back to at least one of the first and second drones.

14. A method of neutralizing a person exhibiting dangerous motions, the method comprising the steps of:
traversing a first flying race drone of a plurality of drones toward the person by a human operator at a base station;
traversing the first flying race drone over a person's head and maintaining the first flying race drone above the person's head so that an offensive mechanism of the first flying race drone is deployable against the person;
traversing a second flying race drone of the plurality of drones based on a flight pattern of the first flying race drone without further human interaction by the human operator to fly at a height at or below four feet so that the person is within a field of view of a camera on the second flying race drone and data from the camera on the second flying race drone is used to neutralize the person; and
traversing the first flying race drone to offensively maneuver against the person based on the data from the camera on the second flying race drone.

15. A method of neutralizing a person exhibiting dangerous motions, the method comprising the steps of:
traversing a first flying race drone of a plurality of drones toward the person by a human operator at a base station;
traversing the first flying race drone over a person's head and maintaining the first flying race drone above the person's head so that an offensive mechanism of the first flying race drone is deployable against the person;
traversing a second flying race drone of the plurality of drones based on a flight pattern of the first flying race drone without further human interaction by the human operator to fly at a height at or below four feet so that the person is within a field of view of a camera on the second flying race drone and data from the camera on the second flying race drone is used to neutralize the person; and traversing the first flying race drone to offensively maneuver against the person based on the data from the camera on the second flying race drone;

landing a third flying race drone adjacent to the person to take a place of the first flying race drone or the second flying race drone when a battery level of the first or second flying race drones is low.

16. The method of claim 15 further comprising the steps of traversing the third flying race drone above the person's head and maintaining the third flying race drone above the person's head, and traversing the first flying race drone away from the person.

* * * * *